United States Patent
Fujimoto

(10) Patent No.: US 10,319,969 B2
(45) Date of Patent: Jun. 11, 2019

(54) LEAD-ACID BATTERY AND METHOD OF MANUFACTURING LID MEMBER OF LEAD-ACID BATTERY

(71) Applicant: GS Yuasa International Ltd., Kyoto-shi, Kyoto (JP)

(72) Inventor: Naoki Fujimoto, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 315 days.

(21) Appl. No.: 15/082,184

(22) Filed: Mar. 28, 2016

(65) Prior Publication Data
US 2016/0293918 A1    Oct. 6, 2016

(30) Foreign Application Priority Data
Mar. 30, 2015    (JP) .................. 2015-069360

(51) Int. Cl.
*H01M 2/12* (2006.01)
*H01M 2/02* (2006.01)
(Continued)

(52) U.S. Cl.
CPC ....... *H01M 2/1252* (2013.01); *H01M 2/0242* (2013.01); *H01M 2/043* (2013.01); *H01M 2/0473* (2013.01); *H01M 10/06* (2013.01); *H01M 2220/20* (2013.01); *Y02E 60/126* (2013.01); *Y02P 70/54* (2015.11)

(58) Field of Classification Search
CPC .. H01M 2/1525; H01M 2/043; H01M 2/0473; H01M 2/024; H01M 10/06; H01M 2220/20
See application file for complete search history.

(56) References Cited

U.S. PATENT DOCUMENTS

| 4,613,550 A | 9/1986 | Kump |
|---|---|---|
| 8,323,811 B2 | 12/2012 | Saito et al. |

(Continued)

FOREIGN PATENT DOCUMENTS

| GB | 2353630 | 2/2001 |
|---|---|---|
| JP | 63126150 | 5/1988 |

(Continued)

*Primary Examiner* — Osei K Amponsah
(74) *Attorney, Agent, or Firm* — Rankin, Hill & Clark LLP

(57) ABSTRACT

Provided is a lead-acid battery which includes: an element; an electrolyte solution; a container housing the element and the electrolyte solution; and a lid member sealing the container, wherein the lid member includes: a middle lid covering the container; an upper lid welded to an upper portion of the middle lid in an overlapping manner; and an exhaust passage arranged between the middle lid and the upper lid, through which an inside of the container is communicated with an outside, wherein a bottom surface of the exhaust passage is inclined such that the solution in the passage returns into the container, and the upper lids include: a passage wall welded to the middle lid and forming a side wall of the exhaust passage; and a transverse wall formed on a ceiling surface of the exhaust passage and traversing the exhaust passage, and a lower end portion of the transverse wall is positioned above a welded portion between the passage wall and the middle lid.

9 Claims, 21 Drawing Sheets

(51) Int. Cl.
*H01M 10/06* (2006.01)
*H01M 2/04* (2006.01)

(56) References Cited

U.S. PATENT DOCUMENTS

| | | |
|---|---|---|
| 2003/0017381 A1 | 1/2003 | Mazumdar |
| 2008/0032186 A1 | 2/2008 | Muhe |
| 2009/0325040 A1 | 12/2009 | Saito et al. |
| 2010/0178552 A1 | 7/2010 | Kim |
| 2012/0052348 A1 | 3/2012 | Andersen |
| 2014/0017539 A1 | 1/2014 | Gibellini |
| 2014/0023911 A1 | 1/2014 | Gibellini |
| 2014/0147733 A1 | 5/2014 | Park |

FOREIGN PATENT DOCUMENTS

| | | | |
|---|---|---|---|
| JP | 8022815 | | 1/1996 |
| JP | 2002540567 | | 11/2002 |
| JP | 2008041587 | A2 | 2/2008 |
| JP | 2008177042 | A2 | 7/2008 |
| JP | 4138275 | | 8/2008 |
| JP | 2009016063 | A2 | 1/2009 |
| JP | 2009193693 | A2 | 8/2009 |
| JP | 4516098 | B2 | 8/2010 |
| JP | 2010-272264 | * | 12/2010 ............. H01M 2/12 |
| JP | 2010272264 | A2 | 12/2010 |
| JP | 4698153 | B2 | 6/2011 |
| JP | 2012515428 | | 7/2012 |
| JP | 5048652 | | 10/2012 |
| JP | 5095992 | | 12/2012 |
| JP | 2013004436 | A2 | 1/2013 |
| JP | 5148861 | | 2/2013 |
| JP | 5148862 | | 2/2013 |
| JP | 5183985 | | 4/2013 |
| JP | 5295113 | | 9/2013 |
| JP | 5326196 | | 10/2013 |
| JP | 5326291 | | 10/2013 |
| JP | 5348951 | B2 | 11/2013 |
| JP | 5365046 | B2 | 12/2013 |
| JP | 5365080 | B2 | 12/2013 |
| JP | 5396161 | B2 | 1/2014 |
| JP | 5446326 | B2 | 3/2014 |
| JP | 2014510379 | | 4/2014 |
| JP | 2014513386 | | 5/2014 |
| JP | 5521390 | B2 | 6/2014 |
| JP | 2014107262 | A2 | 6/2014 |
| WO | 0057502 | | 9/2000 |
| WO | 2010140408 | A1 | 12/2010 |

* cited by examiner

FIG. 16

| PROJECTING HEIGHT L OF TRANSVERSE WALL [mm] | EVALUATION RESULT (NUMBER OF NG) |
|---:|---:|
| 0 | 10 |
| 0.2 | 8 |
| 0.5 | 7 |
| 1 | 1 |
| 1.5 | 0 |
| 2 | 0 |
| 2.5 | 0 |
| 5 | 0 |

FIG. 17

| PLACES WHERE TRANSVERSE WALL IS FORMED | EVALUATION RESULT (NUMBER OF NG) |
|---|---:|
| ONLY ON COMMON PASSAGE U | 5 |
| ONLY ON TRANSVERSE WALL 131A SHOWN IN FIG. 9 | 1 |
| ONLY ON TRANSVERSE WALL 131B SHOWN IN FIG. 9 | 1 |

CARRIED OUT WITH PROJECTING HEIGHT L OF TRANSVERSE WALL (L= [mm])

LEAD-ACID BATTERY AND METHOD OF MANUFACTURING LID MEMBER OF LEAD-ACID BATTERY

CROSS-REFERENCE TO RELATED APPLICATIONS

This application claims the benefit of Japanese patent application No. 2015-069360, filed on Mar. 30, 2015, which is incorporated by reference.

FIELD

The present invention relates to a technique for suppressing a leakage of solution droplets caused by vibrations.

BACKGROUND

A lead-acid battery used in an automobile or the like has, for suppressing rising of an internal pressure of the battery, a structure for discharging a gas generated in a container from an exhaust port. For example, in Japanese patent No. 5521390 (patent literature 1) and JP-A-2014-107262 (patent literature 2), a lid member which seals a container has the double lid structure formed of a middle lid and an upper lid, and an exhaust passage is formed between both lids. A bottom surface of the exhaust passage is inclined downward toward a return flow hole which is communicated with the inside of the container so that solution droplets in the exhaust passage returns to the inside of the container from the return flow hole while moving along the inclined bottom surface.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

As described above, patent literature 1 and patent literature 2 disclose the configuration where solution droplets in the exhaust passage return to the inside of the container. However, when vibrations are continuously applied to a lead-acid battery, there may be a case where solution droplets leak to the outside from the exhaust port.

The present invention has been made in view of such circumstances, and it is an object of the present invention to provide a lead-acid battery in which a leakage of solution droplets caused by vibrations can be suppressed.

A lead-acid battery according to an aspect of the present invention includes: an element; an electrolyte solution; a container housing the element and the electrolyte solution; and a lid member sealing the container, wherein the lid member includes: a middle lid covering the container; an upper lid welded to an upper portion of the middle lid in an overlapping manner; and an exhaust passage arranged between the middle lid and the upper lid, and making the inside of the container and the outside communicate with each other, wherein a bottom surface of the exhaust passage is inclined such that the solution in the passage returns into the container, and the upper lid includes: a passage wall welded to the middle lid and forming a side wall of the exhaust passage; and a transverse wall formed on a ceiling surface of the exhaust passage and traversing the exhaust passage, and a lower end portion of the transverse wall is positioned above a welded portion between the passage wall and the middle lid. The above-mentioned lead-acid battery is a so-called flooded-type lead-acid battery where the inside of the container is communicated with the outside, and differs from a sealed-type lead-acid battery (valve-regulated lead-acid battery).

BRIEF DESCRIPTION OF DRAWINGS

The foregoing and other features of the present invention will become apparent from the following description and drawings of an illustrative embodiment of the invention in which:

FIG. 16 is a table showing a result of evaluation of a vibration test.

FIG. 17 is a table showing a result of evaluation of the vibration test.

DESCRIPTION OF EMBODIMENTS

Figure 1:
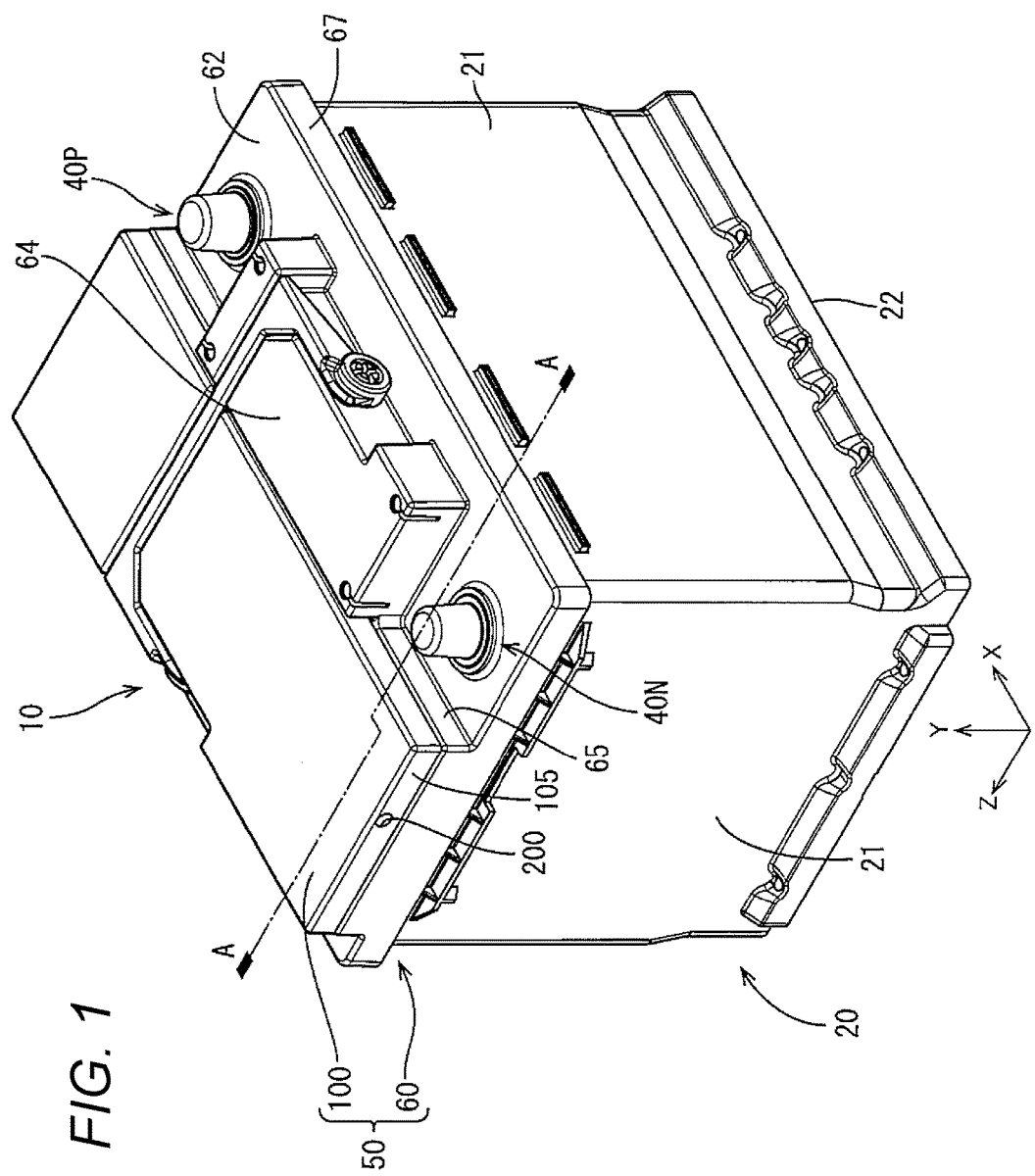
FIG. 1 is a perspective view of a lead-acid battery according to one embodiment of the present invention.

According to an aspect of the present invention, there is provided a lead-acid battery which includes: an element; an electrolyte solution; a container housing the element and the electrolyte solution; and a lid member sealing the container, wherein the lid member includes: a middle lid covering the container; an upper lid welded to an upper portion of the middle lid in an overlapping manner; and an exhaust passage arranged between the middle lid and the upper lid, through which an inside of the container is communicated with an outside, wherein a bottom surface of the exhaust passage is inclined such that the solution in the passage returns into the container, and the upper lids include: a passage wall welded to the middle lid and forming a side wall of the exhaust passage; and a transverse wall formed on a ceiling surface of the exhaust passage and traversing the exhaust passage, and a lower end portion of the transverse wall is positioned above a welded portion between the passage wall and the middle lid.

According to another aspect of the present invention, there is provided a method of manufacturing a lid member which seals a container of a lead-acid battery, wherein the lid member includes: a middle lid covering the container; an upper lid welded to an upper portion of the middle lid in an overlapping manner; and an exhaust passage arranged between the middle lid and the upper lid, through which an inside of the container is communicated with an outside, wherein a bottom surface of the exhaust passage is inclined such that the solution in the passage returns into the container, and the upper lids include: a passage wall welded to the middle lid and forming a side wall of the exhaust passage; and a transverse wall formed on a ceiling surface of the exhaust passage and traversing the exhaust passage, a height of the transverse wall being set lower than a height of the passage wall, wherein the method comprises a welding in which the passage wall of the upper lid is melted by being brought into contact with a heating member and, thereafter, the passage wall is brought into contact with the middle lid thus welding the passage wall of the upper lid and the middle lid to each other, and in the welding, the transverse wall of the upper lid is not brought into contact with the heating member so as to prevent the transverse wall from being melted.

With these configurations, a leakage of solution droplets caused by vibrations can be suppressed.

The inventor of the present invention has extensively observed the movement of solution droplets in the exhaust passage, and has found, for the first time in this technical field, that a phenomenon that solution droplets move along a ceiling surface of the exhaust passage occurs when vibrations are continuously applied to a lead-acid battery. Based on such finding, the inventor of the present invention has found, for the first time in this technical field, that when vibrations are continuously applied to a lead-acid battery, solution droplets of an electrolyte solution continuously move along a ceiling surface of the exhaust passage, reaches an exhaust port, and leaks to the outside. Based on such finding, the inventor of the present invention has come up with an idea. That is, a transverse wall which traverses the passage is formed on the ceiling surface so as to make solution droplets which move along the ceiling surface of the exhaust passage minimally reach an exhaust port. The solution droplets which move along the ceiling surface is dammed by the transverse wall and fall on a bottom surface, and fallen solution droplets are made to return through a flow passage formed by imparting inclination to the bottom surface.

The inventor of the present invention also has considered that it is desirable to increase a height of the transverse wall as high as possible to make the transverse wall which dams solution droplets moving along the ceiling surface perform its function effectively, and has studied forming of a transverse wall having the same height as a passage wall on the ceiling surface of the upper lid as a plan. However, contrary to the expectation of the inventor, there arises a possibility that an effect of suppressing a leakage of solution droplets from an exhaust port becomes insufficient with such a configuration. This possibility is explained more specifically. In welding the middle lid and the upper lid to each other, a flat heating plate is disposed between the middle lid and the upper lid, the middle lid and the upper lid are brought into contact with the heating plate so that the middle lid and the upper lid are melted and, thereafter, the heating plate is removed and the middle lid and the upper lid are made to approach to each other and are brought into contact with each other so that the middle lid and the upper lid are welded to each other. In this case, when the passage wall and the transverse wall have the same height, the transverse wall is melted. Due to vibrations generated in a step of welding the middle lid and the upper lid to each other, or due to an acceleration generated when the melted middle lid and upper lid are made to approach to each other to stop by being brought into contact with each other, a force directed toward a bottom surface of the middle lid acts on the upper lid (transverse wall). Since the transverse wall opposedly faces the bottom surface without having an object to be welded unlike the passage wall and hence, assuming that a force directed toward the bottom surface of the middle lid acts on the transverse wall in a state where the transverse wall is melted together with the passage wall, a shape of a melted portion of the transverse wall collapses in an unstable manner so that the melted portion extends toward the bottom surface of the exhaust passage, is torn off or is adhered to the bottom surface of the middle lid and is solidified. In this case, a flow passage formed by imparting inclination to the bottom surface of the exhaust passage is interrupted by a solidified material solidified in the flow passage thus giving rise to a possibility that it is difficult for solution droplets in the exhaust passage to return to the container. When vibrations are continuously applied to the lead-acid battery in a state where solution droplets in the exhaust passage minimally returns to the container, solution droplets in the exhaust passage is gradually increased, and an amount of solution which moves along the ceiling surface of the exhaust passage is also increased relatively. As a result, although the transverse wall is provided, there is possibility that solution droplets reach the exhaust port by moving along the ceiling surface of the exhaust passage and leak to the outside.

Further, when a plurality of lead-acid batteries are manufactured while having the above-mentioned possibility, there may be a case where a battery where the above-mentioned solidified material is adhered to a bottom surface of a middle lid exists irregularly. However, it is extremely difficult to check by appearance whether or not the battery is a battery in which a solidified material is adhered to a bottom surface of a middle lid after welding the middle lid and an upper lid to each other. That is, it is difficult to identify only the battery in which a solidified material is adhered to the bottom surface of the middle lid from a plurality of manufactured lead-acid batteries.

Based on such understanding, the inventor of the present invention has found out a task to be solved particular to a lead-acid battery having a return flow structure that there is a possibility of the occurrence of a defect in the return flow structure when a transverse wall is melted and the identification of the lead-acid battery in which such a defect occurs is difficult, and the inventor has arrived at the present invention based on such finding. By forming the transverse wall on the ceiling surface of the exhaust passage and by positioning the lower end portion of the transverse wall above the welded portion between the passage wall and the middle lid as in the case of the present invention, a leakage of solution droplets caused by vibrations can be suppressed.

On the other hand, in the field of this business, sufficient studies have not been made with respect to the transverse wall, and attentions have not been paid to the task particular to the lead-acid battery having the return flow structure that there is a possibility of the occurrence of a defect in the return flow structure when a transverse wall is melted and the identification of the lead-acid battery in which such a defect occurs is difficult. Accordingly, in the conventional lead-acid battery having the return flow structure, it is considered unnecessary to form the transverse wall on the ceiling surface of the exhaust passage and to position the lower end portion of the transverse wall above the welded portion between the passage wall and the middle lid. In actual products, a transverse wall is formed on a ceiling surface of an exhaust passage and a lower end portion of the transverse wall is not positioned above a welded portion between a passage wall and a middle lid.

According to an embodiment of the present invention, it is preferable to adopt the following configurations.

A projecting height of the transverse wall from the ceiling surface is 1.0 mm or more. With such a configuration, it is remarkably difficult for solution droplets which move along the ceiling surface to get over the transverse wall and hence, an effect of suppressing a leakage of solution droplets can be remarkably enhanced.

The container is partitioned into a plurality of cell chambers, the exhaust passage includes a plurality of individual passages which communicate with the plurality of cell chambers, respectively, and a common passage which is communicated with the individual passages and collectively discharges a gas from the individual passages to the outside, and the transverse wall is formed on each of ceiling surfaces of the individual passages.

An effect of suppressing a leakage of solution droplets when vibrations are continuously applied to the lead-acid battery is compared between the case where the transverse wall is provided to the common passage and the case where the transverse wall is provided to the individual passages corresponding to the respective cell chambers. As a result of the comparison, the effect of suppressing a leakage of solution droplets is remarkably enhanced when the transverse wall is provided to the individual passages.

The reason that the effect of suppressing a leakage of solution droplets is remarkably enhanced when the transverse wall is provided to the individual passages is described hereinafter. In case of providing the individual passages and the common passage within a limited space defined between the middle lid and the upper lid, in general, the individual passages are formed of a labyrinth like passage which uses a wide space for making water vapor condense as much as possible, and the common passage is formed of a monotonous passage having a narrow width capable of discharging a gas. The common passage is formed of a monotonous passage having a narrow width and hence, the direction of the movement of a solution in the passage is restricted. Accordingly, when the transverse wall is formed in the common passage, a solution easily gets over the transverse wall and hence, an effect of suppressing a leakage of solution droplets is small regardless of the presence or non-presence of melting of the transverse wall. On the other hand, the individual passage is a labyrinth like passage using a wide space and hence, a solution minimally gets over the transverse wall. Accordingly, by forming the transverse wall on the individual passage and by not melting the transverse wall, the effect of suppressing a leakage of solution droplets can be remarkably enhanced.

<Embodiment>

One embodiment is described with reference to FIG. 1 to FIG. 18.

1. Structure of Lead-Acid Battery 10

Figure 2:
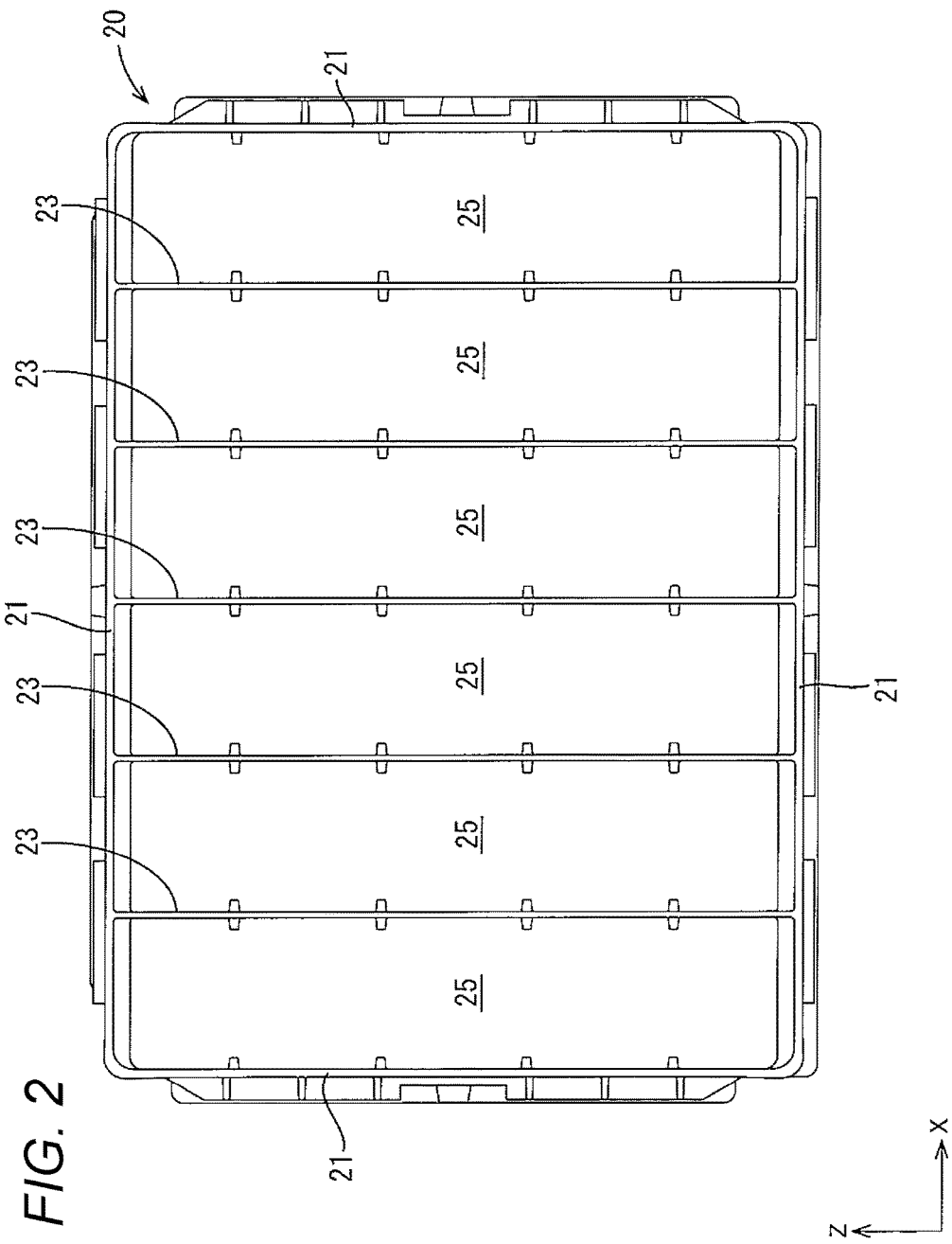
FIG. 2 is a plan view of a container.
Figure 3:
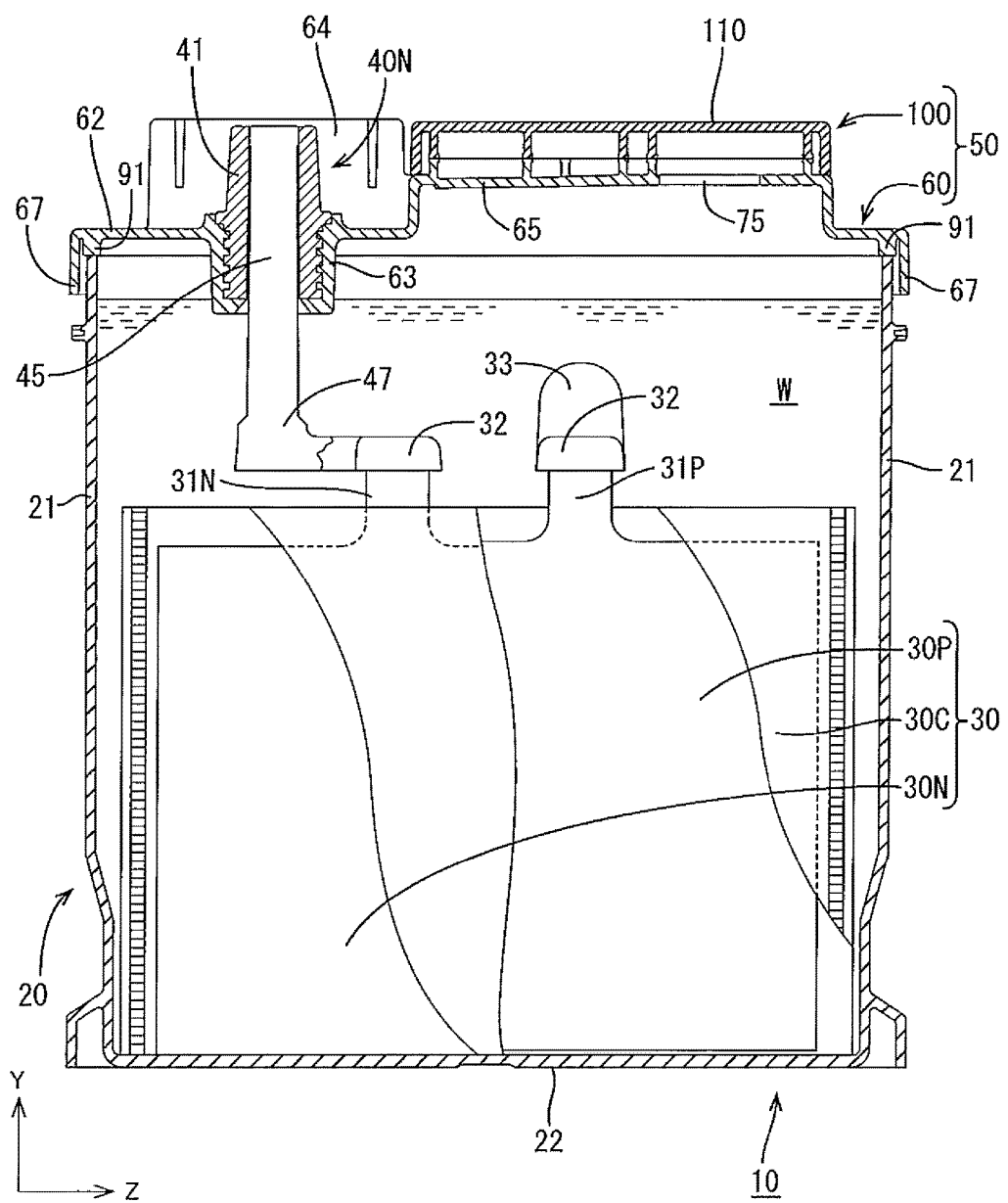
FIG. 3 is a vertical cross-sectional view (a cross-sectional view taken along a line A-A in FIG. 1) of the lead-acid battery.

The lead-acid battery 10 is a flooded-type lead-acid battery including an electrolyte solution which has fluidity. As shown in FIG. 1 to FIG. 3, the lead-acid battery 10 includes a container 20, an element 30, an electrolyte solution W, terminal portions 40P, 40N and a lid member 50. In the description made hereinafter, a lateral width direction (a direction along which the terminal portions 40P, 40N are arranged) of the container 20 is assumed as "X direction", a height direction (a vertical direction) of the container 20 is assumed as "Y direction", and a depth direction of the container 20 is assumed as "Z direction".

The container 20 is made of a synthetic resin. The container 20 includes four outer walls 21 and a bottom wall 22, and is formed into a box shape having an open upper surface. As shown in FIG. 2, the container 20 has a plurality of (five in this embodiment) partitions 23. The partitions 23 are formed substantially at equal intervals in the X direction thus partitioning the inside of the container into a plurality of cell chambers 25. Six cell chambers 25 are provided in the lateral width direction (the X direction in FIG. 2) of the container 20. In each cell chambers 25, the element 30 is housed together with an electrolyte solution W made of a dilute sulfuric acid.

As shown in FIG. 3, the element 30 is formed of positive electrode plates 30P, negative electrode plates 30N and separators 30C each of which separates both plates 30P, 30N. The respective plates 30P, 30N are formed by filling a grid with an active material, and lug portions 31P, 31N are formed on upper portions of the respective plates 30P, 30N. The lug portions 31P, 31N are provided for connecting the plates 30P, 30N having the same polarity to each other in the cell chamber 25 by means of a strap 32. A main component of the active material of the positive electrode plate 30P is lead dioxide, and a main component of an active material of the negative electrode plate 30N is lead.

The strap 32 is formed into a plate shape, and two sets of straps 32 for a positive electrode and a negative electrode are provided for each cell chamber 25. The structure is adopted where the elements 30 of the six cell chambers 25 are connected in series by electrically connecting the positive straps 32 in the cell chambers 25 arranged adjacently to each other and also the negative straps 32 in the cell chambers 25 arranged adjacently to each other through connecting portions 33 formed on the straps 32.

Figure 4:
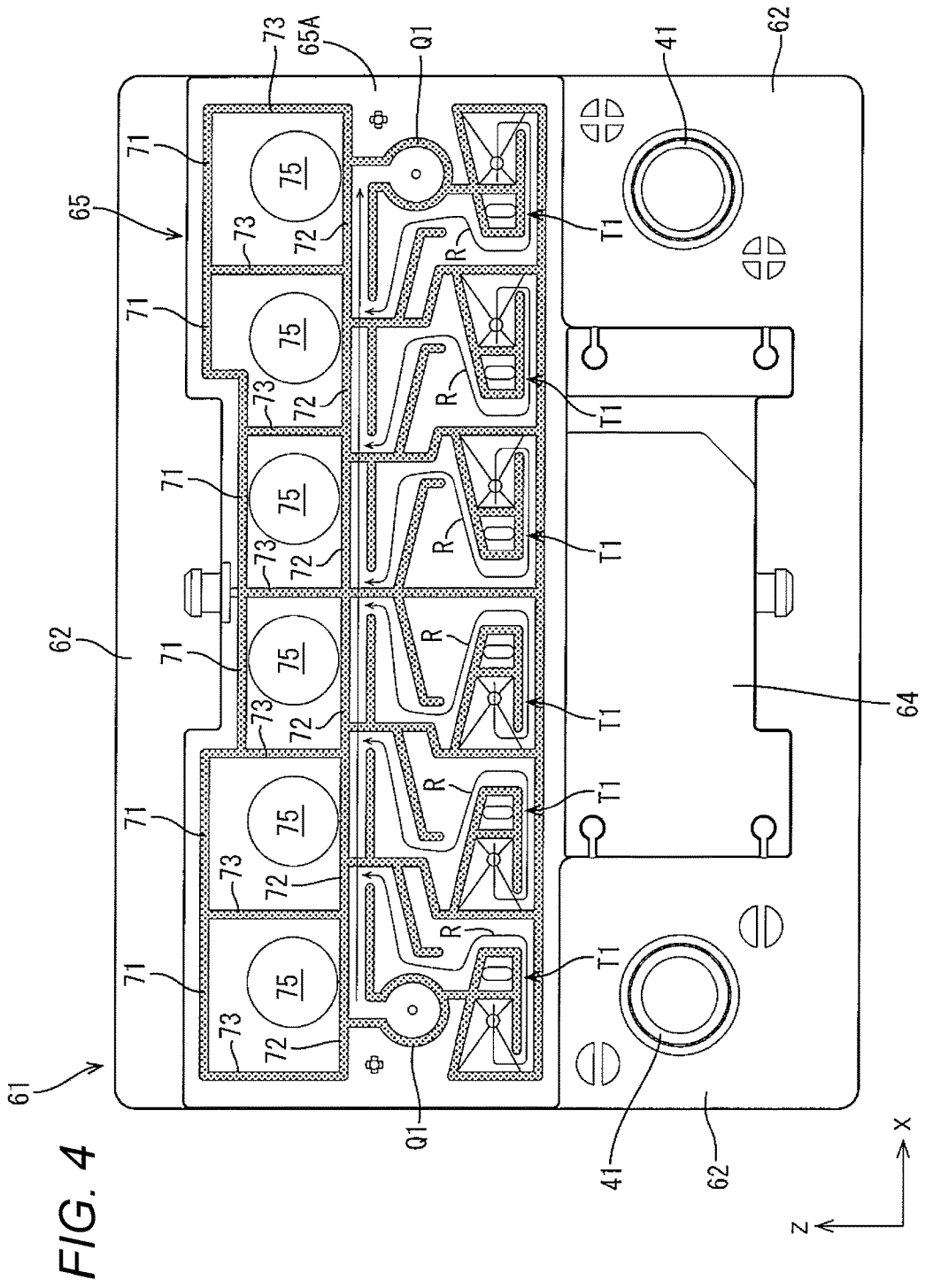
FIG. 4 is a plan view of a middle lid.
Figure 5:
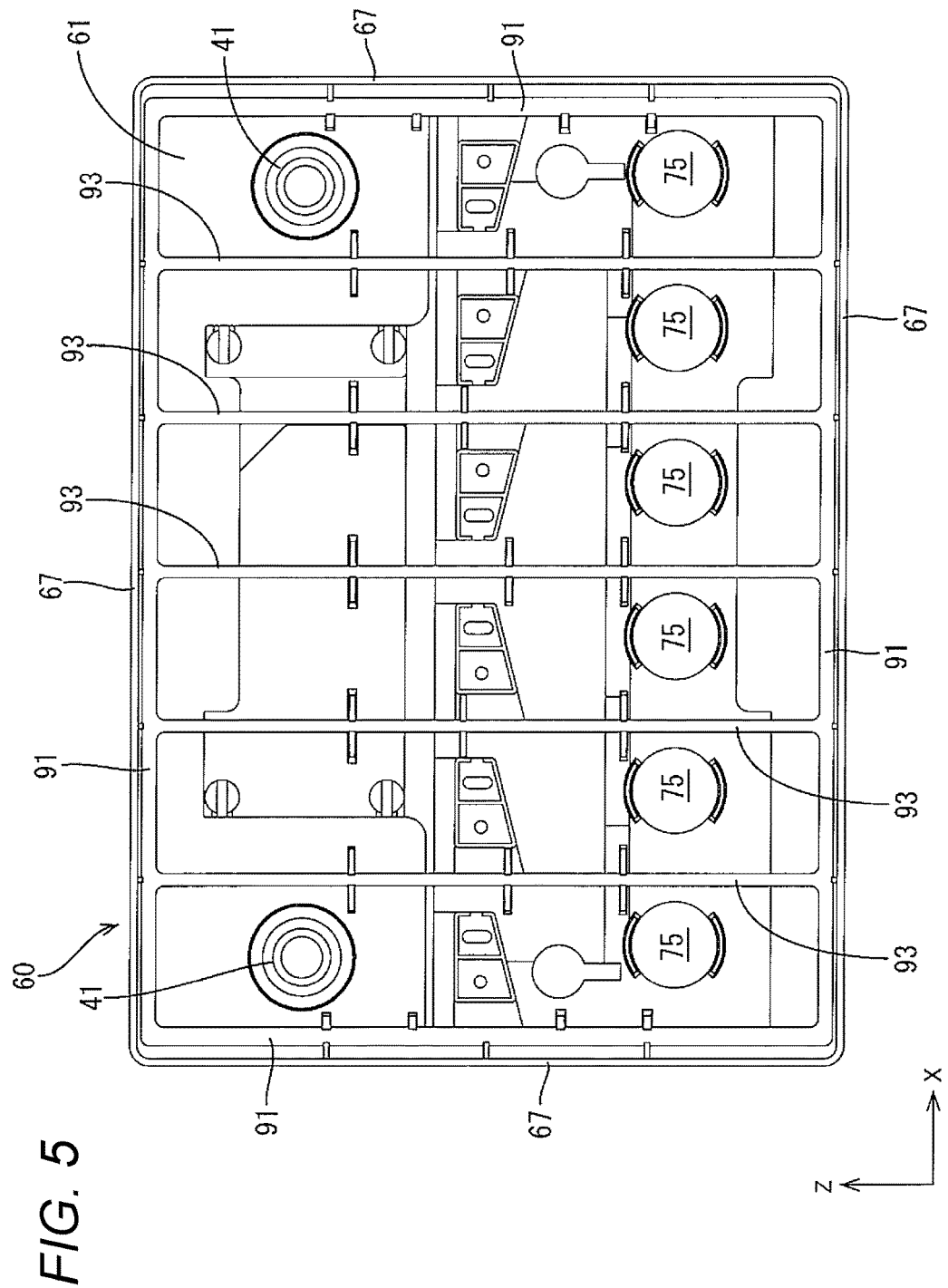
FIG. 5 is a bottom view of the middle lid.

The lid member 50 includes a middle lid 60 and an upper lid 100. FIG. 4 is a plan view of the middle lid 60 as viewed from above in a state where the upper lid 100 is removed, and FIG. 5 is a bottom view of the middle lid 60 as viewed from below. As shown in FIG. 4 and FIG. 5, the middle lid 60 is made of a synthetic resin, and includes a lid body 61 and a flange portion 67.

The lid body 61 of the middle lid 60 has a size which allows the lid body 61 to seal an upper surface of the container 20. Four ribs 91 and a plurality of (five in this embodiment) lid partitions 93 are formed on a lower surface of the lid body 61. The respective ribs 91 project downward from a lower surface of the lid body 61. The four ribs 91 are provided corresponding to respective outer walls 21 of the container 20. The respective lid partitions 93, in the same manner as the ribs 91, project downward from a lower surface of the lid body 61. The respective lid partitions 93 are provided corresponding to the respective partitions 23 of the container 20.

The respective ribs 91 of the middle lid 60 are positioned so as to overlap with upper end surfaces of the respective outer walls 21 of the container 20, and the respective lid partitions 93 are positioned so as to overlap with upper end surfaces of the respective partitions 23 of the container 20. By making the ribs 91 and the lid partitions 23 overlap with the respective walls 21, 23 on the container 20, the container 20 and the respective cell chambers 25 are made to have the airtight structure. To maintain airtightness between the respective ribs 91 and the outer wall 21 and between the lid partitions 93 and partitions 23, the respective ribs 91 and the outer wall 21 are bonded to each other by thermal welding, and the lid partitions 93 and the partitions 23 are also bonded to each other by thermal welding. A flange portion 67 is formed on an outer periphery edge of the lid body 61. The flange portion 67 extends downward from a lower surface of the lid body 61, and surrounds an upper portion of the outer wall 21 of the container 20.

Further, as shown in FIG. 1 and FIG. 4, the lid body 61 of the middle lid 60 has a low surface portion 62, a high surface portion 64 and a plateau portion 65 thus being formed into a shape where the difference in height is made among these portions. The low surface portion 62 is formed on both end portions in the Z direction of the lid member 50. A terminal portion 40P on a positive electrode side and a terminal portion 40N on a negative electrode side are arranged on low surface portions 62 disposed on both end portions in the X direction of the one end side of the lid member 50 in the Z direction. In the description made hereinafter, one end side in a Z direction where the terminal portion 40P on a positive electrode side and the terminal portion 40N on a negative electrode side are arranged is set as a front side.

The structure of the terminal portion 40P on a positive electrode side and the structure of the terminal portion 40N on a negative electrode side are equal to each other and hence, the structure is described hereinafter by taking the terminal portion 40N on a negative electrode side as an example. As shown in FIG. 3, the terminal portion 40N on a negative electrode side includes a bushing 41 and a pole 45. The bushing 41 is made of metal such as a lead alloy and has a hollow cylindrical shape. As shown in FIG. 3, the bushing 41 penetrates a cylindrical mounting portion 63 integrally formed with the middle lid 60, and an upper half of the bushing 41 projects from an upper surface of the low surface portion 62. The bushing 41 is configured such that the upper half portion of the bushing 41 which is exposed from the upper surface of the low surface portion 62 forms a terminal connecting portion, and a connecting terminal such as a harness terminal (not shown in the drawing) is assembled to the bushing 41.

The middle lid 60 is formed by integral molding by supplying a resin into a die in which the bushing 41 is inserted. Accordingly, the mounting portion 63 is integrally formed with the bushing 41 and covers an outer periphery of a lower portion of the bushing 41 without forming a gap therebetween. That is, the bushing 41 has the structure where portions of the bushing 41 other than the upper half portion which projects from the upper surface of the middle lid 60 are embedded in the mounting portion 63.

The pole 45 is made of metal such as a lead alloy and has a circular columnar shape. The pole 45 is positioned inside the bushing 41. The pole 45 is longer than the bushing 41, an upper portion of the pole 45 is positioned inside the bushing 41, and a lower portion of the pole 45 projects downward from a lower surface of the bushing 41. An upper end portion (distal end portion) of the pole 45 is bonded to the bushing 41 by welding, and a proximal end portion 47 of the pole 45 is bonded to the strap 32 of the elements 30.

The high surface portion 64 of the middle lid 60 is formed at the center on a front side of the lid body 61. The high surface portion 64 is positioned between the low surface portions 62 formed on both end portions of the lid body 61 in the X direction. An upper surface of the high surface portion 64 is set higher than upper surfaces of the terminal portions 40P, 40N. With such a configuration, even if a metal member or the like is placed on an upper portion of the battery, the metal member is minimally simultaneously brought into contact with the terminal portions 40P, 40N thus preventing the terminal portions 40P, 40N from short-circuiting with each other.

The plateau portion 65 is formed on a rear side of the lid body 61. The plateau portion 65 extends in the X direction so as to traverse six cell chambers 25 formed in the container 20. An upper surface of the plateau portion 65 is set higher than the low surface portion 62 and lower than the high surface portion 64.

As shown in FIG. 4, six electrolyte solution filling holes 75 are formed in an upper surface wall 65A of the plateau portion 65 of the middle lid 60 at intervals in the X direction. These six electrolyte solution filling holes 75 vertically penetrate the upper surface wall 65A of the plateau portion 65, and respectively communicate with six cell chambers 25. With such a configuration, it is possible to fill the respective cell chambers 25 of the container 20 with an electrolyte solution through the respective electrolyte solution filling holes 75.

The plateau portion 65 includes lower-side partitions 71 to 73 which project upward from the upper surface wall 65A. The lower-side partitions 71 to 73 are provided to the respective electrolyte solution filling holes 75, and form quadrangular frames which surround the respective electrolyte solution filling holes 75. The respective lower-side partitions 72 are arranged on the same straight line extending in the X direction.

Figure 6:
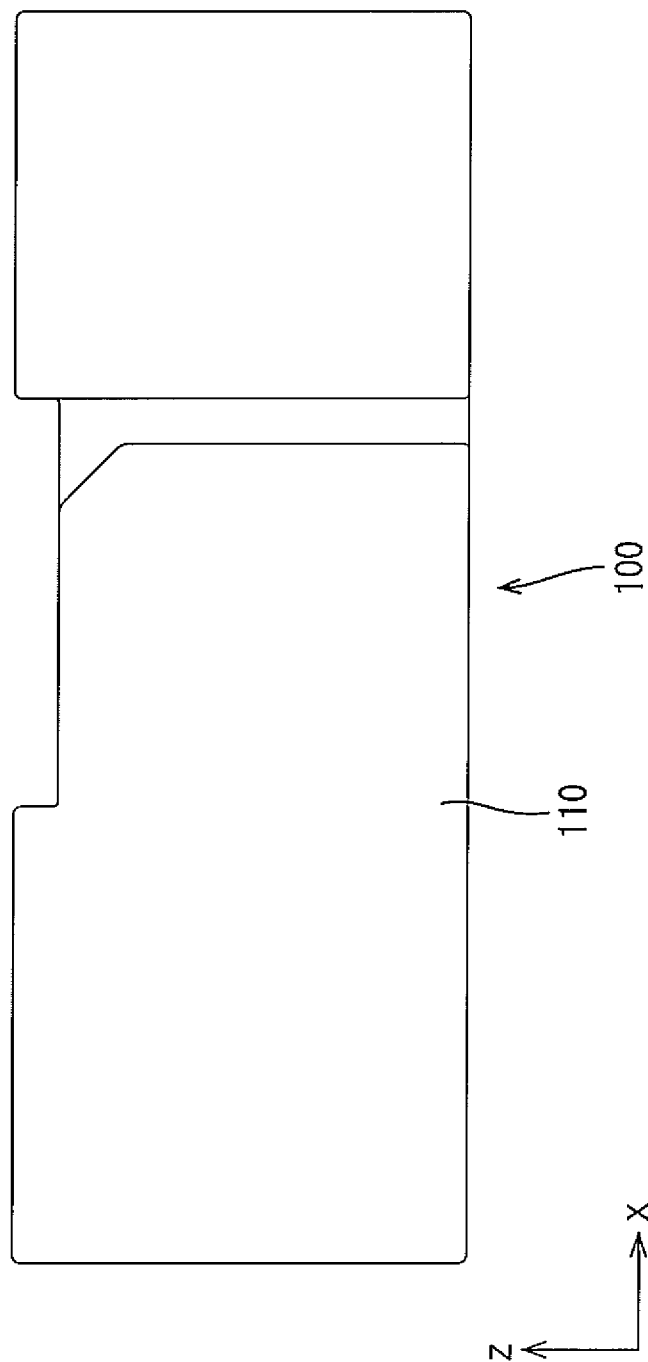
FIG. 6 is a plan view of an upper lid.
Figure 7:
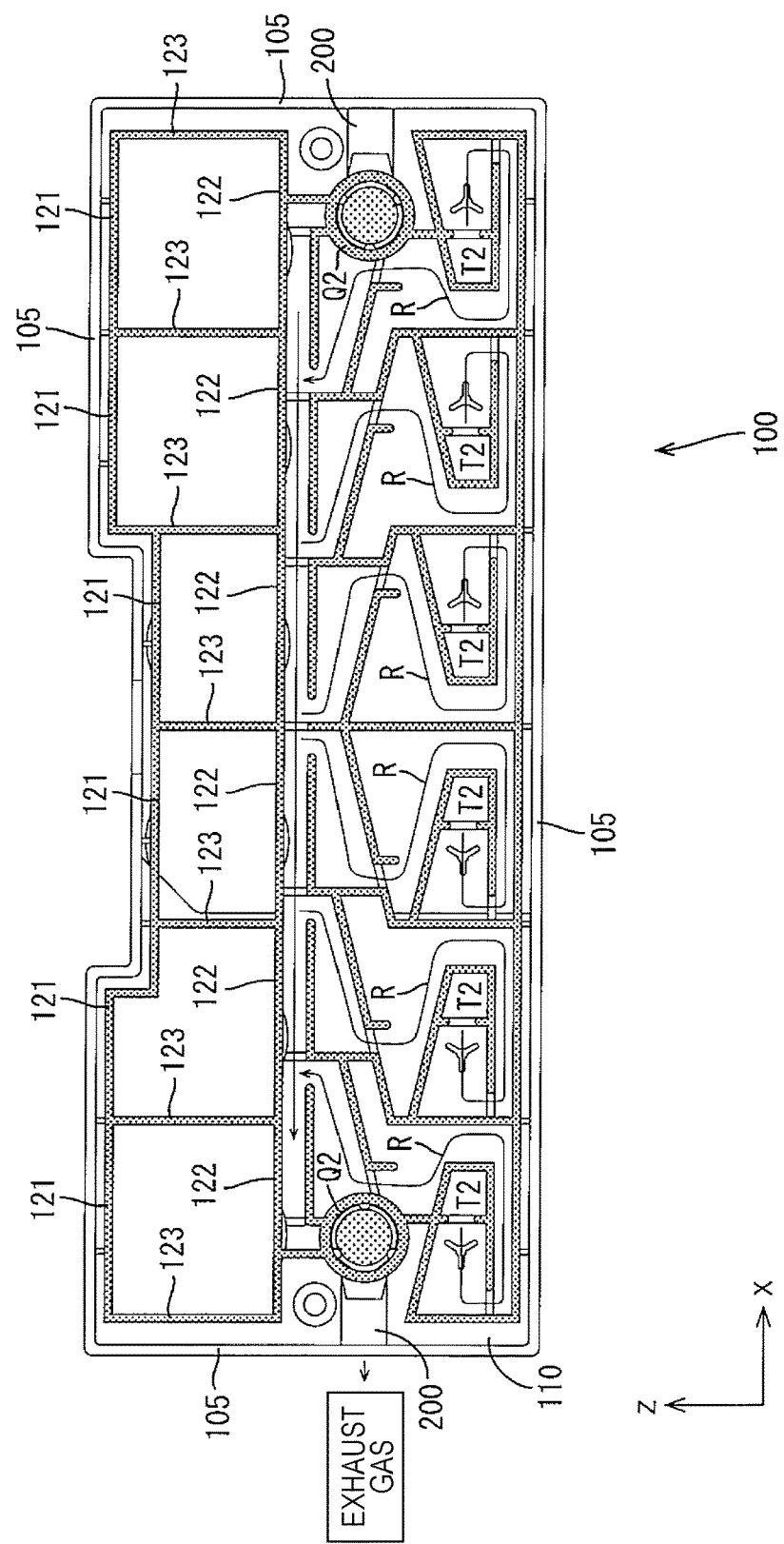
FIG. 7 is a bottom view of the upper lid.

The upper lid 100 is made of a synthetic resin in the same manner as the middle lid 60. FIG. 6 is a plan view of the upper lid 100 as viewed from above, and FIG. 7 is a bottom view of the upper lid 100 as viewed from below. The upper lid 100 includes a lid body 110 and a flange portion 105. The lid body 110 has a rectangular shape following the shape of the plateau portion 65 of the middle lid 60, and is mounted on the plateau portion 65 of the middle lid 60 in an overlapping manner. The flange portion 105 is formed on an outer periphery edge of the lid body 110. The flange portion 105 extends downward from the outer periphery edge of the lid body 110, and surrounds an outer periphery of the plateau portion 65.

As shown in FIG. 7, the lid body 110 includes upper-side partitions 121 to 123. The upper-side partitions 121 to 123 project downward from a lower surface of the lid body 110, and are provided to the respective electrolyte solution filling holes 75. The upper-side partitions 121 to 123 form quadrangular frames in the same manner as the lower-side partitions 71 to 73. The respective upper-side partitions 122 are arranged on the same straight line extending in the X direction.

The respective upper-side partitions 121 to 123 correspond to the respective lower-side partitions 71 to 73, and the respective upper-side partition 121 to 123 are arranged on an upper side of the respective lower-side partitions 71 to 73 in an overlapping manner. These upper-side partitions 121 to 123 and lower-side partitions 71 to 73 form partitions which surround the respective electrolyte solution filling holes 75. The upper-side partitions 121 to 123 and the lower-side partitions 71 to 73 have end surfaces thereof bonded to each other by thermal welding.

Further, the lid member 50 of the lead acid battery 10 includes, between the middle lid 60 and the upper lid 100, exhaust sleeve portions T, individual passages R, a common passage U, and collective exhaust portions Q. This configuration is described in conjunction with the drawings hereinafter. The individual passage R and the common passage U correspond to "exhaust passage" of the present invention.

(Description of Exhaust Sleeve Portion T)

The exhaust sleeve portion T is formed, between the middle lid 60 and the upper lid 100, for each one of the cell chambers 25 of the container 20. The exhaust sleeve portion T is formed into a sleeve shape, and forms a gas flow passage in the inside thereof. The exhaust sleeve portion T is communicated with both the cell chamber 25 and the individual passage R of the container 20, and performs a function of allowing a gas generated in the cell chamber 25 to pass through the individual passage R.

Figure 8:
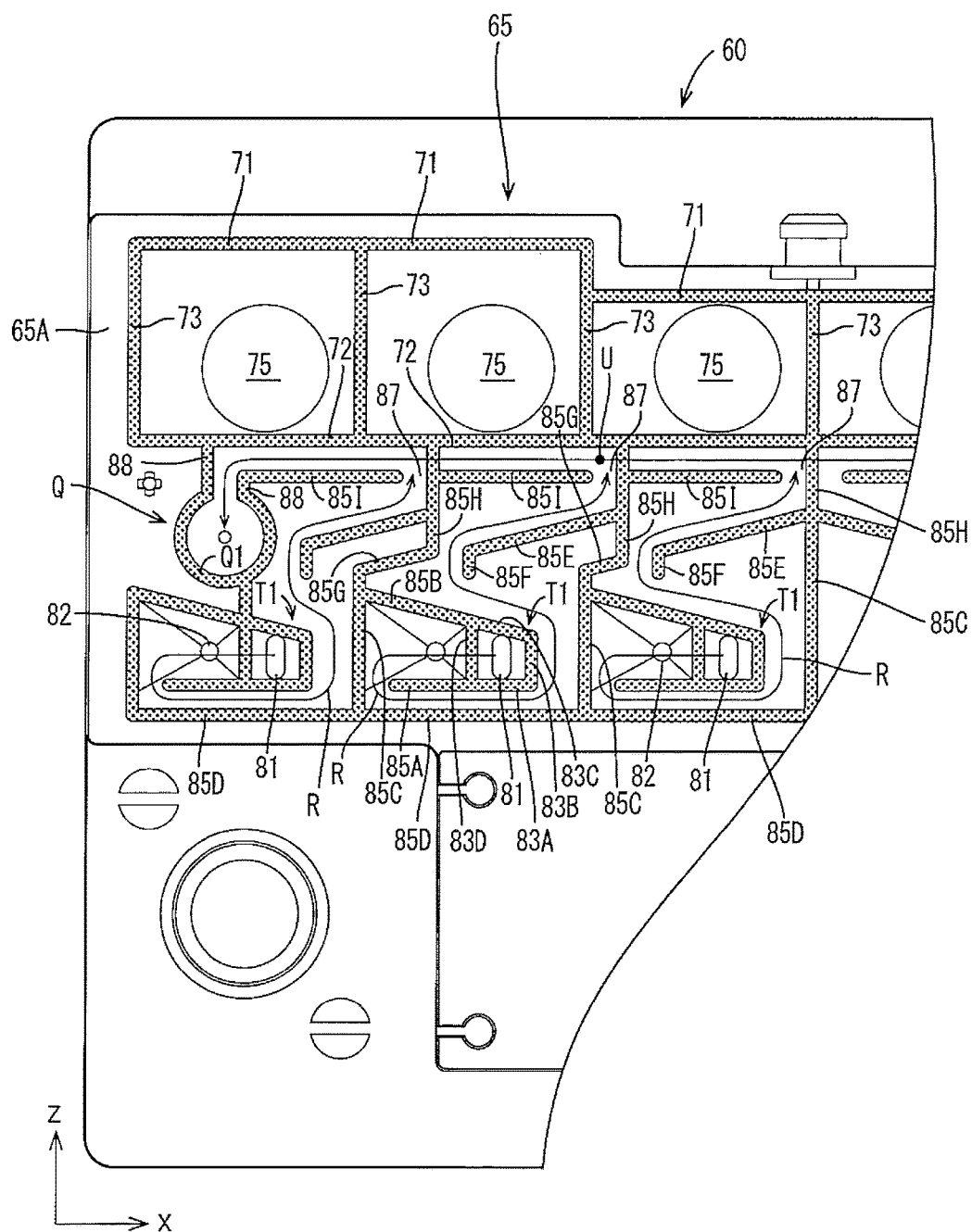
FIG. 8 is a view showing a portion in FIG. 4 in an enlarged manner (showing an exhaust passage for a gas).

To be more specific, as shown in FIG. 4, six sets of lower-side sleeve portions T1 are formed on the plateau portion 65 of the middle lid 60 in a state where the lower-side sleeve portions T1 are arranged in the X direction. As shown in FIG. 4 and FIG. 8, the lower-side sleeve portion T1 is formed into an angular sleeve shape, and is formed of four lower-side peripheral walls 83A to 83D. Four lower-side peripheral walls 83A to 83D project upward from the upper surface wall 65A of the plateau portion 65. Six sets of communication holes 81 are formed in an upper surface wall 65A of the plateau portion 65 such that the communication holes 81 are arranged in an X direction. Each communication hole 81 is positioned inside each lower-side sleeve portion T1. Each communication hole 81 vertically penetrates the upper surface wall 65A of the plateau portion 65 and is communicated with each cell chamber 25 of the container 20.

Figure 9:
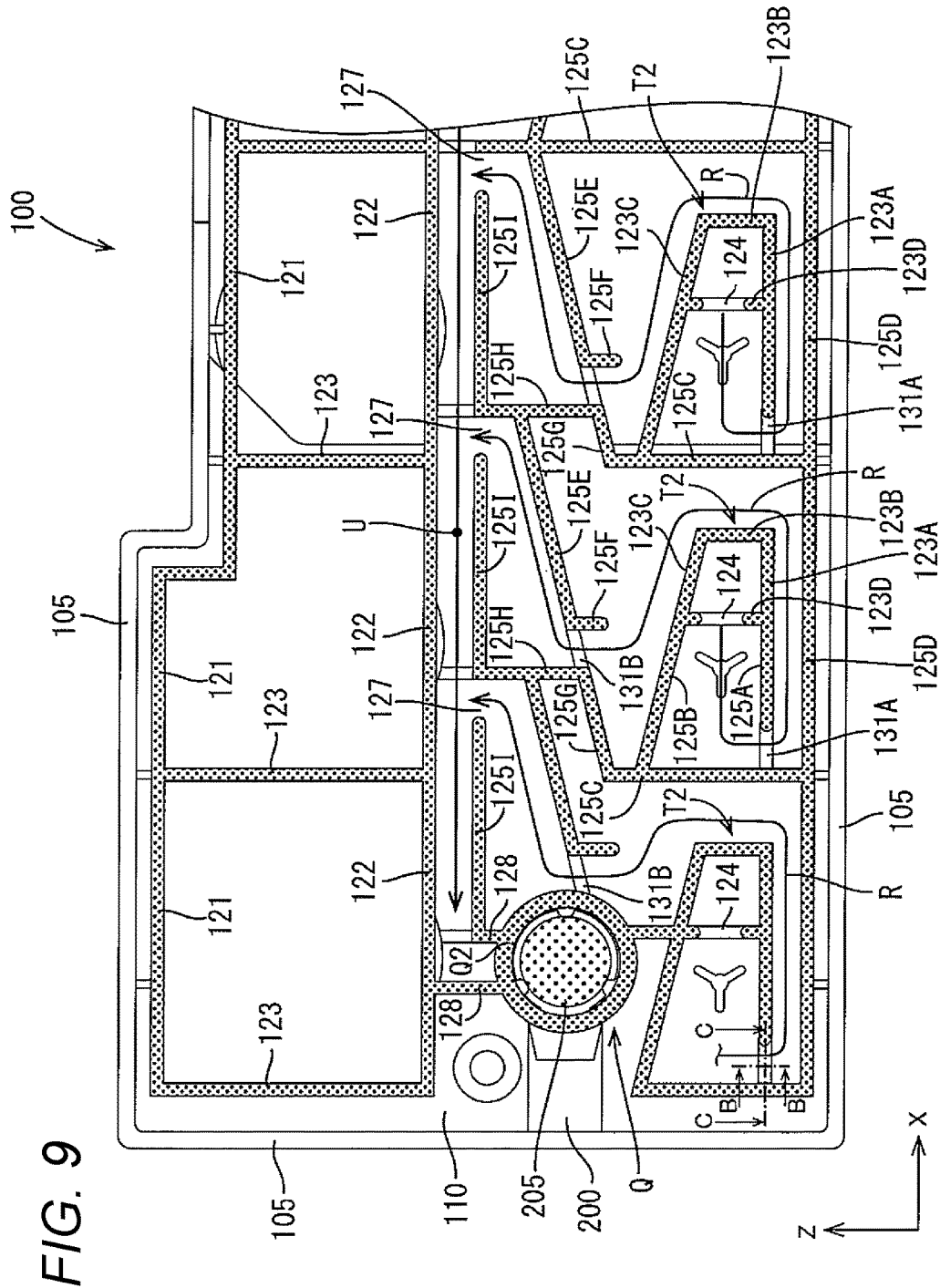
FIG. 9 is a view showing a portion in FIG. 7 in an enlarged manner (showing an exhaust passage for a gas).

On the other hand, as shown in FIG. 7, the lid body 110 of the upper lid 100 includes six sets of upper-side sleeve portions T2 in a state where the upper-side sleeve portions T2 are arranged in the X direction. As shown in FIG. 9, the upper-side sleeve portion T2 is formed of an angular sleeve, and is formed of four upper-side peripheral walls 123A to 123D. Four upper-side peripheral walls 123A to 123D project downward from a lower surface of the lid body 110. Out of the upper-side peripheral walls 123A to 123D, a notched portion 124 is formed on the upper-side peripheral wall 123D which forms a boundary between the individual passage R and the upper-side sleeve portion T2.

Figure 10:
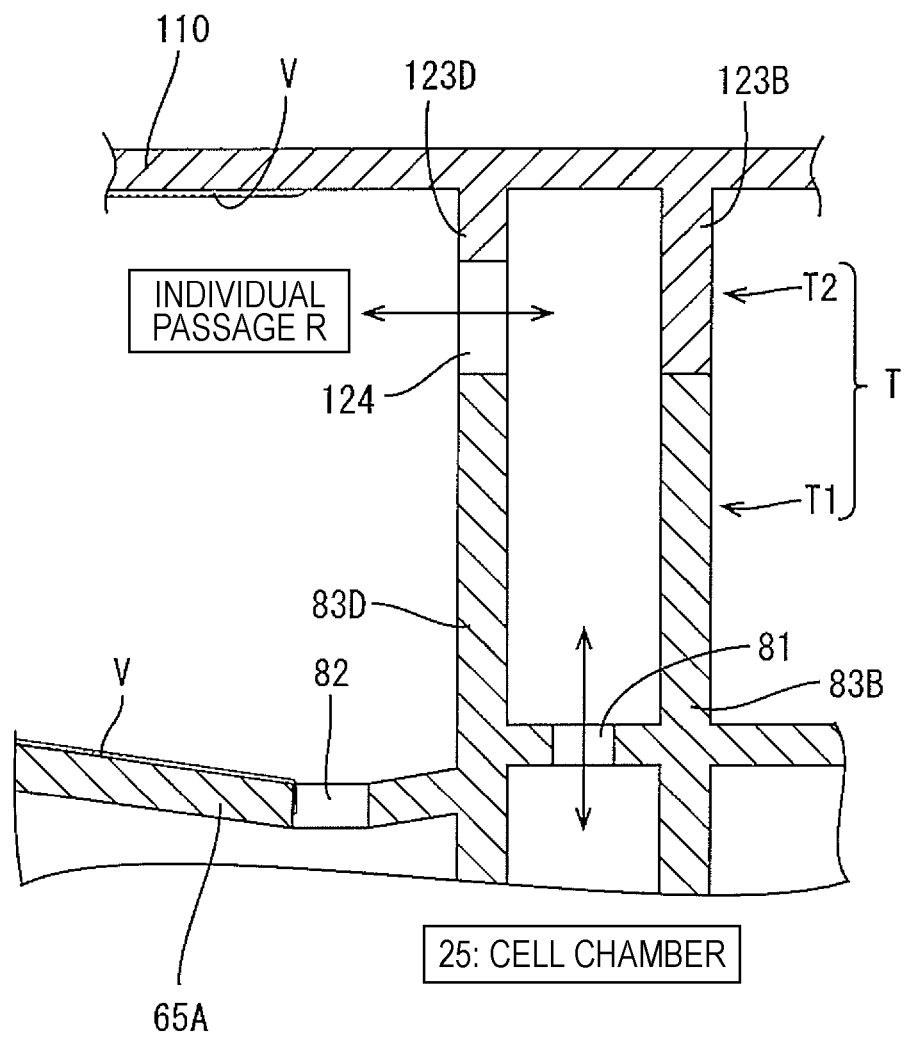
FIG. 10 is a cross-sectional view showing a structure of an exhaust sleeve portion.

In this embodiment, the exhaust sleeve portion T has the split structure formed of the lower-side sleeve portion T1 and the upper-side sleeve portion T2. Each upper-side sleeve portion T2 and each lower-side sleeve portion T1 vertically overlap with each other thus forming one exhaust sleeve portion T as shown in FIG. 10. Each exhaust sleeve portion T is communicated with each cell chamber 25 through each communication holes 81, and is communicated with each individual passage R through the notched portion 124. With such a configuration, a gas generated in each cell chamber 25 of the container 20 can pass through the inside of the exhaust sleeve portion T from the communication hole 81 and, thereafter, can flow into the individual passage R through the notched portion 124. Each lower-side sleeve portion T1 and each upper-side sleeve portion T2 have end surfaces thereof bonded to each other by thermal welding so as to ensure airtightness of the exhaust sleeve portion T.

(Description of Individual Passage R)

The individual passage R is formed between the middle lid 60 and the upper lid 100 for each one of the cell chambers 25 of the container 20. The respective individual passages R communicate with the common passage U and perform a function of making a gas flown out from the exhaust sleeve portions T flow through the common passage U.

Hereinafter, the configuration of the individual passages R is specifically described. As shown in FIG. 8, the plateau portion 65 of the middle lid 60 has a plurality of lower-side passage walls 85A to 85I for each one of the cell chambers 25 of the container 20. The plurality of lower-side passage walls 85A to 85I project upward from the upper surface wall 65A of the plateau portion 65. Upper end surfaces of these lower-side passage walls 85A to 85I are set to have the same height.

The lower-side passage wall 85A is a wall formed by extending the lower-side peripheral wall 83A of the lower-side sleeve portion T1 in the leftward direction in FIG. 8, and is formed continuously with the lower-side peripheral wall 83A. The lower-side passage wall 85B is a wall formed by extending the lower-side peripheral wall 83C of the lower-side sleeve portion T1 in the leftward direction in FIG. 8, and is formed continuously with the lower-side peripheral wall 83C.

As shown in FIG. 8, the lower-side passage walls 85A to 85I are a mass of walls having different directions. The lower-side passage walls 85A to 85I are connected to other lower-side passage walls 85A to 85I or the lower-side peripheral walls 83A to 83D. The whole wall (the mass of the lower-side passage walls 85A to 85I) is formed into a bent shape. With such a configuration, a path of the individual passage R is formed into a non-straight-line labyrinth shape. The lower-side passage wall 85I extends horizontally in the X direction, and has the relationship where the lower-side passage wall 85I faces the lower-side partition 72 in an opposed manner in the Z direction.

On the other hand, as shown in FIG. 9, the lid body 110 of the upper lid 100 has a plurality of upper-side passage walls 125A to 125I for each one of the cell chambers 25 of the container 20. The plurality of upper-side passage walls 125A to 125I project downward from the lower surface of the lid body 110. Lower end surfaces of these upper-side passage walls 125A to 125I are set to have the same height.

The upper-side passage wall 125A is a wall formed by extending the upper-side peripheral wall 123A of the upper-side sleeve portion T2 in the leftward direction in FIG. 9, and is formed continuously with the upper-side peripheral wall 123A. The upper-side passage wall 125B is a wall formed by extending the upper-side peripheral wall 123C of the upper-side sleeve portion T2 in the leftward direction in FIG. 9, and is formed continuously with the upper-side peripheral wall 123C.

As shown in FIG. 9, the upper-side passage walls 125A to 125I are also a mass of walls extending in different directions. The upper-side passage walls 125A to 125I are, in the same manner as the lower-side passage walls 85A to 85I, connected to other upper-side passage walls 125A to 125I or the upper-side peripheral walls 123A to 123D. The whole wall (the mass of the upper-side passage walls 125A to 125I) is formed into a bent shape. With such a configuration, a path of the individual passage R is formed into a non-straight-line labyrinth shape. The upper-side passage wall 125I extends horizontally in the X direction, and has the relationship where the upper-side passage wall 125I faces the upper-side partition 122 in an opposed manner in the Z direction.

Figure 11:
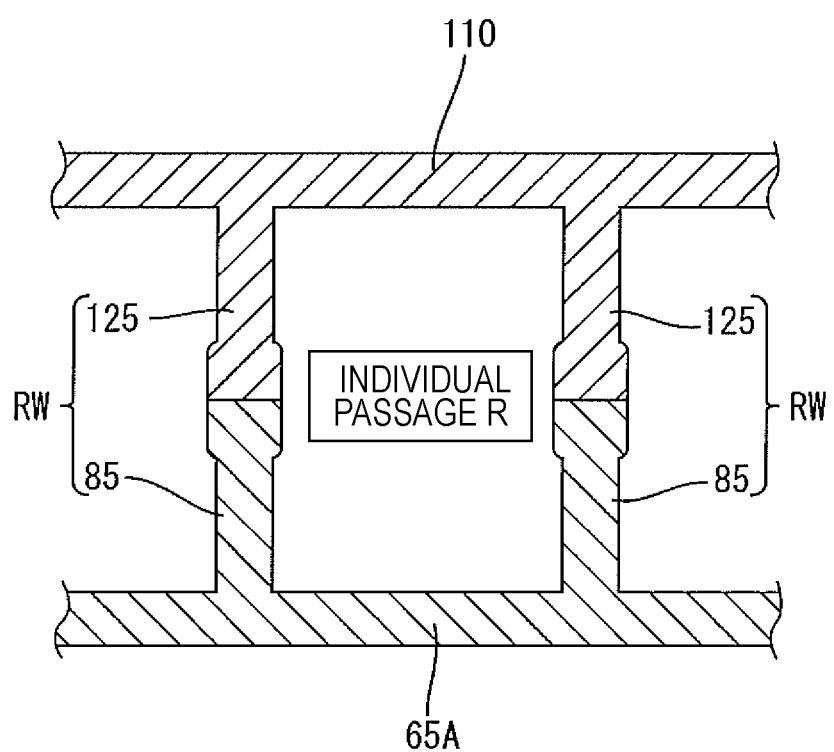
FIG. 11 is a cross-sectional view showing a structure of an individual passage.
Figure 12:
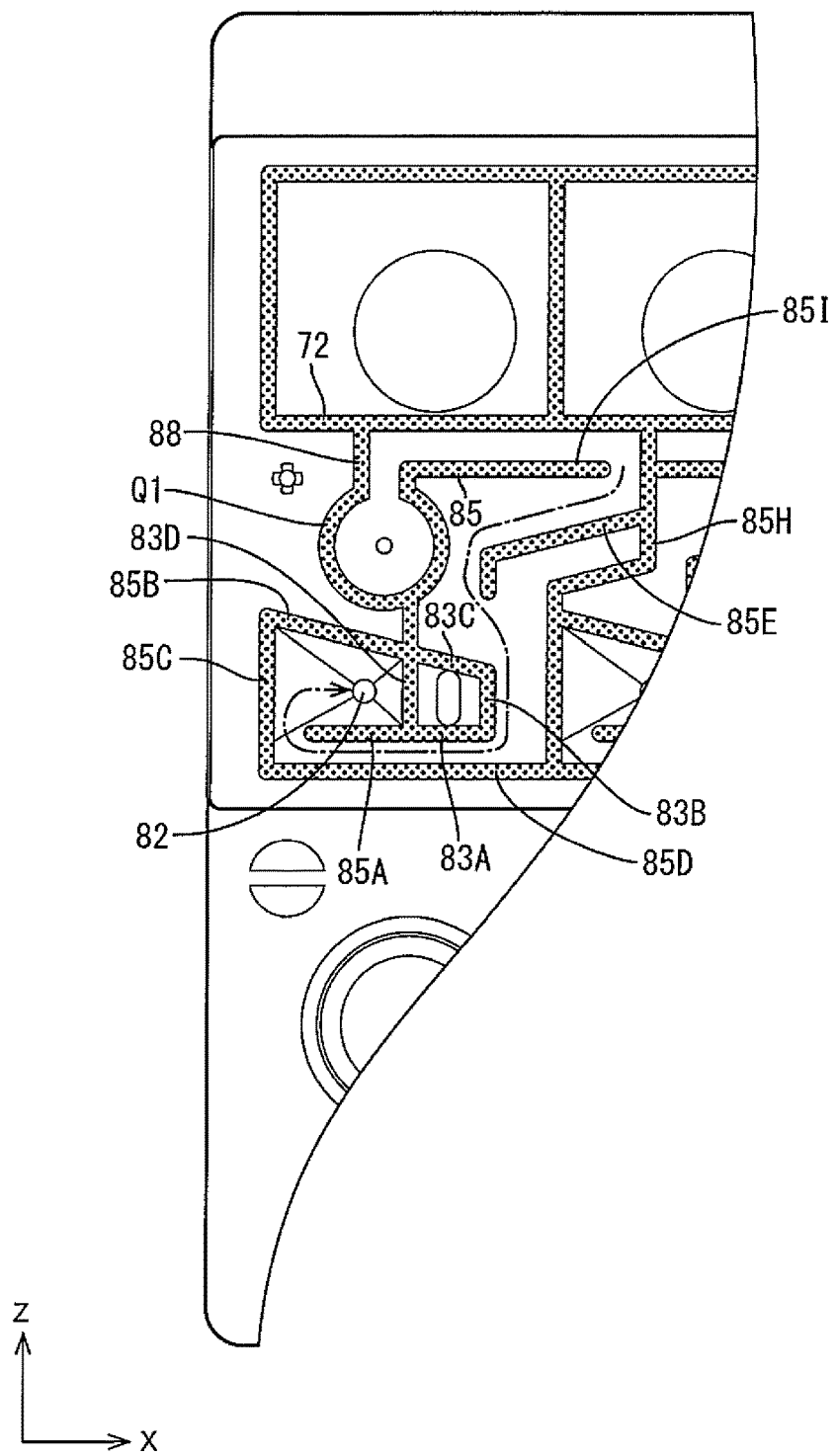
FIG. 12 is a view showing a portion in FIG. 8 in an enlarged manner (showing a return flow passage of an electrolyte solution).

The respective upper-side passage walls 125A to 125I correspond to the respective lower-side passage walls 85A to 85I and overlap with an upper side of the corresponding lower-side passage walls 85A to 85I. As shown in FIG. 11, the lower-side passage wall 85 and the upper-side passage wall 125 form one passage wall RW. The individual passage R is formed between a pair of opposedly facing passage walls RW which form side walls. That is, in this embodiment, the passage wall RW which forms the side wall of the individual passage R has the split structure which is formed of the upper-side passage wall 125 and the lower-side passage wall 85. The lower-side passage wall 85 and the upper-side passage wall 125 have end surfaces thereof bonded to each other by thermal welding so as to ensure airtightness of the individual passage R.

The individual passage R takes a path described in FIG. 9. Using the notched portion 124 formed in the upper-side peripheral wall 123D of the exhaust sleeve portion T as an inlet, a gas advances between the upper-side passage wall 125A and the upper-side passage wall 125B in the leftward direction in FIG. 9 and, thereafter, the gas changes the direction thereof by 90° toward a lower side in FIG. 9 at a position in front of the upper-side passage wall 125C on a left side. Then, the gas passes through a gap formed between the upper-side passage wall 125A and the upper-side passage wall 125C and, thereafter, the gas further changes the direction thereof by 90°, and advances through a gap formed between the upper-side passage wall 125A and the upper-side passage wall 125D and a gap formed between the upper-side peripheral wall 123A and the upper-side passage wall 125D in the rightward direction in FIG. 9. Thereafter, the gas changes the direction thereof toward a rear side in FIG. 9 at a position in front of the upper-side passage wall 125C on a right side.

Then, the gas advances along the upper-side peripheral wall 123C and the upper-side passage wall 125B and, thereafter, passes through a gap formed between the upper-side passage wall 125G and the upper-side passage wall 125E and a gap formed between the upper-side passage wall 125E and the upper-side passage wall 125I sequentially in this order. Eventually, the gas passes through a gap 127 formed between the upper-side passage wall 125I and the upper-side passage wall 125I and reaches the common passage U. Although the individual passage R on the upper lid 100 has been described heretofore, the individual passage R on the lower lid 60 also takes the same path. Further, the paths of the left and right individual passages R are arranged in line symmetry with respect to the center in the X direction using the Z direction as an axis of symmetry.

In this embodiment, as shown in FIG. 8 and FIG. 9, the individual passage R is formed between the lower-side peripheral wall 83A and the lower-side passage wall 85D and between the upper-side peripheral wall 123A and the upper-side passage wall 125D, while the lower-side peripheral walls 83A to 83C which form the lower-side sleeve portion T1 function as a part of the lower-side passage wall, and the upper-side peripheral walls 123A to 123C which form the upper-side sleeve portion T2 function as a part of the upper-side passage wall.

(Description of Common Passage U and Collective Exhaust Portions Q)

As shown in FIG. 8 and FIG. 9, the common passage U is formed between the lower-side partition 72 and the lower-side passage wall 85I and between the upper-side partition 122 and the upper-side passage wall 125I. That is, the common passage U is a passage formed between two side walls, wherein one side wall is formed of the upper-side partition 122 and the lower-side partition 72 and the other side wall is formed of the upper-side passage wall 125I and the lower-side passage wall 85I. The common passage U extends in the X direction. A passage width of the common passage U is fixed over the entire length of the common passage U. The collective exhaust portion Q is formed on both end portions in the X direction which form terminals of the common passage U respectively.

The collective exhaust portions Q are formed between the middle lid 60 and the upper lid 100, and perform a function of collectively discharging a gas which flows into the collective exhaust portions Q from the common passage U to the outside. The collective exhaust portions Q are formed on both end portions of the common passage U in the X direction. Depending on an environment where the lead-acid battery is used, only one of two collective exhaust portions Q is opened and the other of two collective exhaust portions Q is sealed by a plug not shown in the drawing. In this embodiment, a gas which passes through the individual passage R passes through the common passage U and, thereafter, is discharged to the outside through the collective exhaust portion Q on a right side as viewed from a front side in the Z direction (a right side in FIG. 4 and a left side in FIG. 7). In FIG. 8, a gas discharging direction is indicated by an arrow assuming that the collective exhaust portion Q on a left side as viewed from a front side in the Z direction is opened without being sealed.

To be more specific, as shown in FIG. 8, the lower-side sleeve portion Q1 is formed on an upper surface of the plateau portion 65 of the middle lid 60. The lower-side sleeve portion Q1 projects upward from an upper surface wall 65A of the plateau portion 65. On the other hand, as shown in FIG. 9, the upper-side sleeve portion Q2 is formed on the lid body 110 of the upper lid 100. The upper-side sleeve portion Q2 projects downward from a lower surface of the lid body 110. A porous filter 205 is stored in the upper-side sleeve portion Q2. A lower surface of the porous filter 205 is positioned above a lower end surface of the upper-side sleeve portion Q2. The porous filter 205 suppresses the emission of water vapor and suppresses the intrusion of an external spark. The collective exhaust portion Q has the two-split structure formed of the lower-side sleeve portion Q1 on the middle lid 60 and the upper-side sleeve portion Q2 on the upper lid 100. The collective exhaust portion Q is configured such that the upper-side sleeve portion Q2 is mounted on an upper side of the lower-side sleeve portion Q1 in an overlapping manner. The lower-side sleeve portion Q1 and the upper-side sleeve portion Q2 have both end portions thereof bonded to each other by thermal welding so as to ensure airtightness.

As shown in FIG. 8, the lower-side partition 72 and the lower-side passage wall 85I which form the common passage U are connected to the lower-side sleeve portion Q1 of the middle lid 60 by means of the connecting wall 88. As shown in FIG. 9, the upper-side partition 122 and the upper-side passage wall 125I which form the common passage U are connected to the upper-side sleeve portion Q2 of the upper lid 100 by means of the connecting wall 128. The lower-side sleeve portion Q1 has an opening in a connecting portion where the lower-side partition 72 and the lower-side passage wall 85I are connected to the lower-side sleeve portion Q1. Accordingly, the common passage U is communicated with the collective exhaust portion Q so that a gas which flows through six individual passages R flows into the collective exhaust portion Q through the common passage U.

A circular cylindrical exhaust duct 200 is provided to the upper lid 100. One end of the exhaust duct 200 is connected to (is communicated with) the upper-side sleeve portion Q2 of the collective exhaust portion Q, and the other end of the exhaust duct 200 penetrates the flange portion 105 of the upper lid 100 and opens to the outside. Accordingly, a gas supplied to the collective exhaust portion Q from the common passage U can be discharged to the outside through the exhaust duct 200.

That is, in the lead-acid battery 10 of this embodiment, a gas generated in the respective cell chambers 25 of the container 20 firstly flows into the respective individual passages R from the respective exhaust sleeve portions T. Thereafter, the gas which flows through the respective individual passages R passes through the common passage U and flows into the collective exhaust portion Q and, eventually, the gas is discharged to the outside from the exhaust duct 200.

As shown in FIG. 8, a return flow hole 82 is formed on the plateau portion 65 of the middle lid 60 corresponding to each one of the respective cell chambers 25 of the container 20. Each return flow hole 82 is positioned in a region surrounded by the lower-side passage wall 85A, the lower-side peripheral wall 83D, the lower-side passage wall 85B and the lower-side passage wall 85C. That is, each return flow hole 82 is positioned in the individual passage R. In the same manner as the communication hole 81, the return flow hole 82 vertically penetrates the upper surface wall 65A of the plateau portion 65, and is communicated with the cell chamber 25 of the container 20. As shown in FIG. 8, the return flow hole 82 is arranged at an inlet portion of the individual passage R and is disposed at a remotest position in the individual passage R as viewed from the common passage U.

Figure 14:
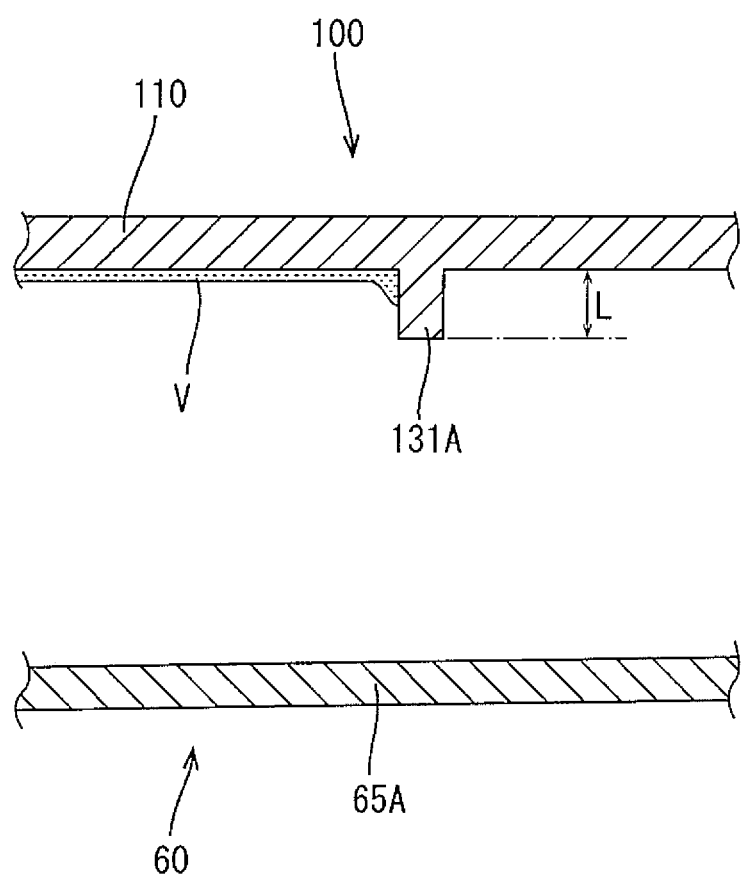
FIG. 14 is a cross-sectional view (a cross-sectional view taken along a line B-B in FIG. 9) of a transverse wall.

An inclination is imparted to the upper surface wall 65A of the plateau portion 65 which is the bottom surface of the individual passage R such that the closer a position on the upper surface wall 65A to the return flow hole 82, the lower the position of the bottom surface becomes (see FIG. 10 and FIG. 14). With such a configuration, it is possible to return solution droplets V such as water droplets formed by water vapor contained in a gas to the respective cell chambers 25 through the return flow holes 82. That is, water vapor contained in a gas generated in the cell chamber 25 condenses in the individual passage R when the gas passes through the individual passage R. The condensed solution droplets V flow toward the return flow hole 82 as indicated by an arrowed broken line in FIG. 12. Accordingly, it is possible to return solution droplets such as water vapor contained in the gas to the respective cell chambers 25.

2. Suppression of Leakage of Solution Droplets V by Transverse Wall 131

Figure 13:
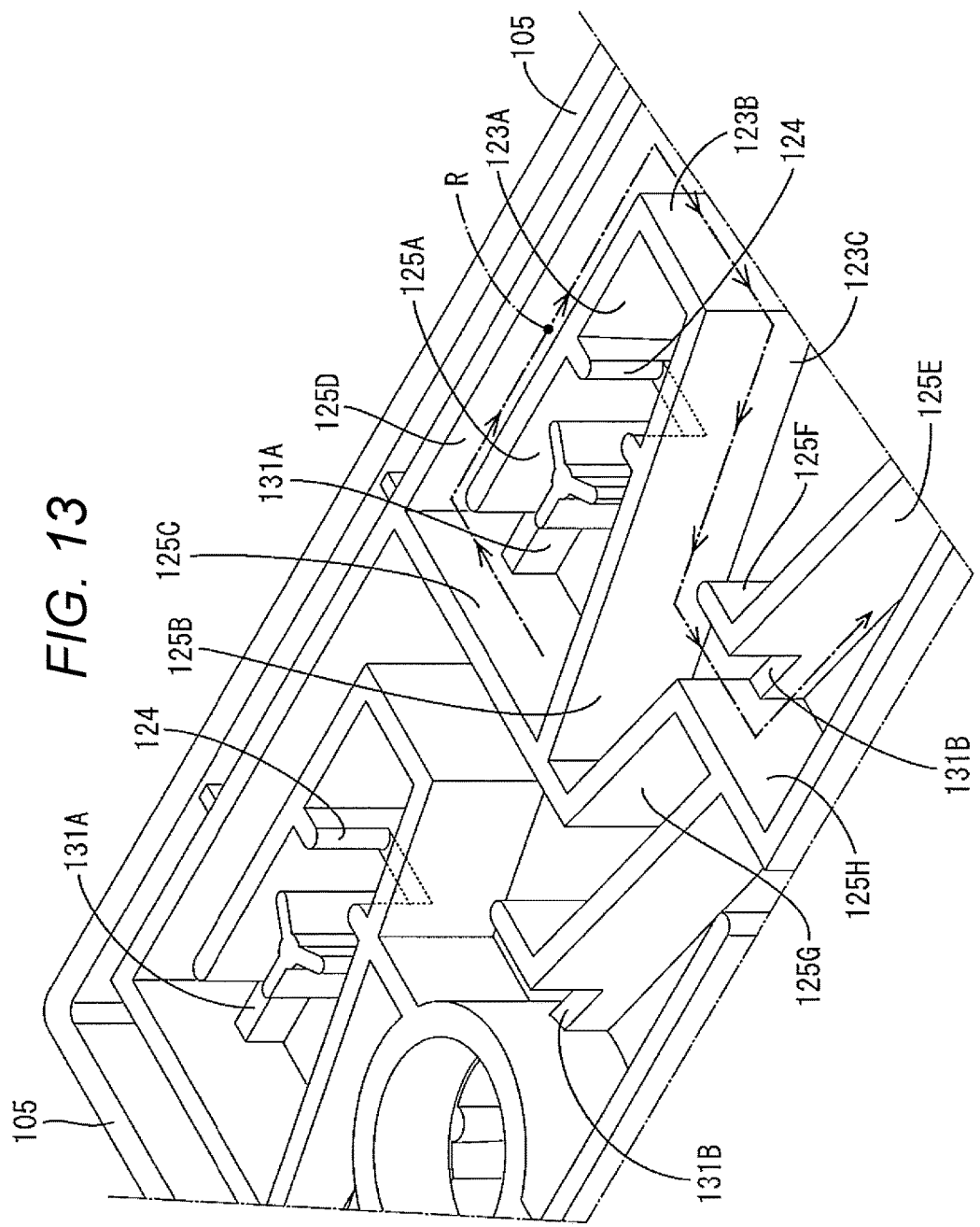
FIG. 13 is a perspective view of the upper lid as viewed from below.

As shown in FIG. 9 and FIG. 13, the lid body 110 of the upper lid 100 has two transverse walls 131A, 131B for each individual passage R. Both the transverse walls 131A, 131B extend downward from a lower surface of the lid body 110, and traverse the individual passage R in a crossing manner. To be more specific, as shown in FIG. 13, the transverse wall 131A is provided between the upper-side passage wall 125A and the upper-side passage wall 125C. That is, the transverse wall 131A is provided at a position away from an inlet of the individual passage R by a predetermined distance. An end portion of the transverse wall 131A on one side is connected to the upper-side passage wall 125A, and an end portion of the transverse wall 131A on the other side is connected to the upper-side passage wall 125C. Accordingly, the transverse wall 131A traverses the individual passage R over an entire width of the passage. Further, the transverse wall 131A is provided on an extension of the upper-side passage wall 125A, and has the relationship with the upper-side passage wall 125C that the transverse wall 131A is orthogonal to the upper-side passage wall 125C. In this embodiment, a projecting height L of the transverse walls 131A, 131B is set to 2.5 mm.

Figure 18:
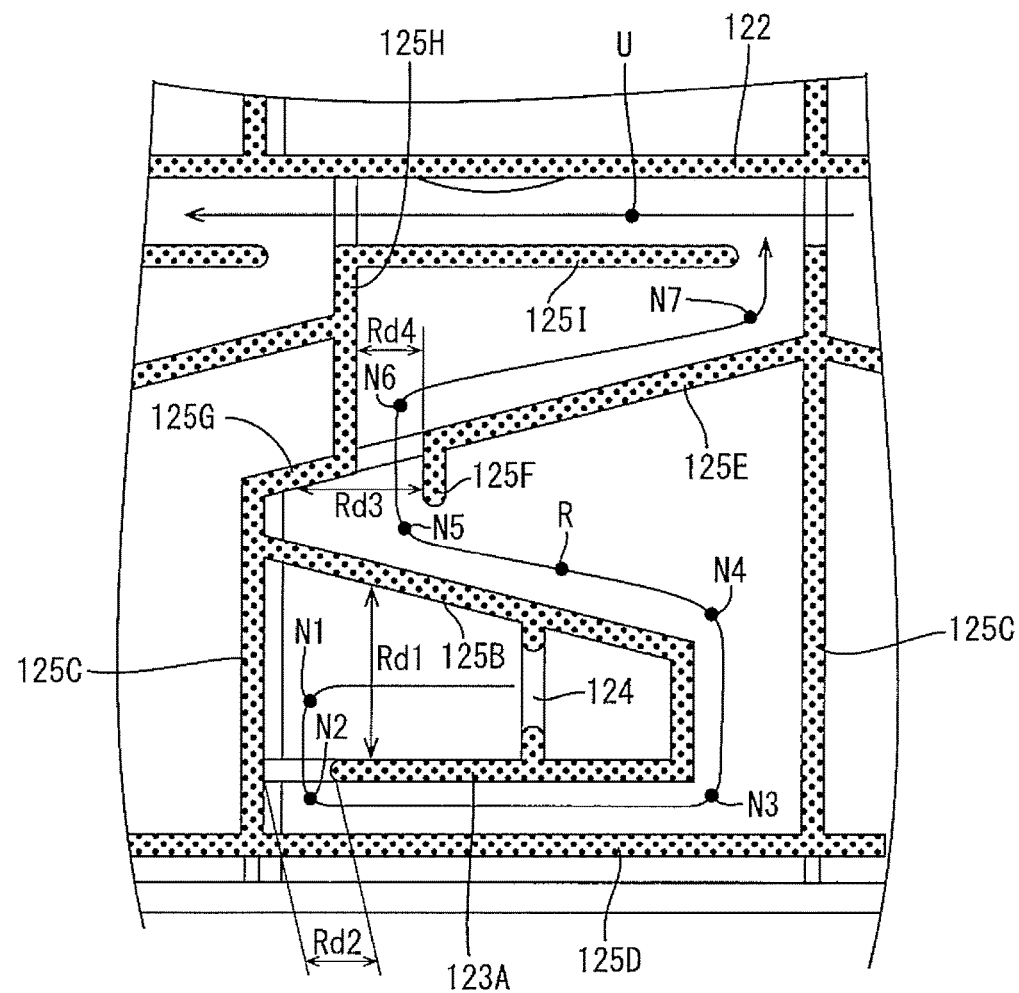
FIG. 18 is a view showing a portion in FIG. 9 in an enlarge manner.

To focus on a passage width of the individual passage R, the transverse wall 131A is provided at a position where the passage width of the individual passage R changes from a wide state to a narrow state in a direction extending toward an exhaust outlet, to be more specific, a position at which the passage width Rd of the individual passage R changes from "Rd1" to "Rd2" as shown in FIG. 18.

To focus on a shape of the individual passage R, the transverse wall 131A is provided corresponding to a bent portion N of the individual passage R. That is, as shown in FIG. 18, the transverse wall 131A is provided corresponding to the bent portion N1 out of a plurality of bent portions N1 to N7 provided to the individual passage R. The individual passage R is bent downward from a left direction in FIG. 18 by 90 degrees at the bent portion N1, and the transverse wall 131A is provided at a position where the direction of the individual passage R is bent downward in FIG. 18.

As shown in FIG. 13, the transverse wall 131B is provided between the upper-side passage wall 125G and the upper-side passage wall 125E. That is, the transverse wall 131B is provided at an approximately intermediate position of the individual passage R. An end portion of the transverse wall 131B on one side is connected to the upper-side passage wall 125G, and an end portion of the transverse wall 131B on the other side is connected to the upper-side passage wall 125E. Accordingly, the transverse wall 131B traverses the individual passage R over an entire width of the passage. The upper-side passage wall 125G, the transverse wall 131B and the upper-side passage wall 125E are provided on the same straight line.

To focus on a passage width of the individual passage R, the transverse wall 131B is provided at a position where the passage width of the individual passage R changes from a wide state to a narrow state in a direction extending toward the exhaust outlet, to be more specific, a position at which the passage width Rd of the individual passage R changes from "Rd3" to "Rd4" as shown in FIG. 18.

The transverse wall 131B is provided corresponding to the bent portion N5 of the individual passage R. That is, the individual passage R is bent in a just upward direction from an oblique left upper direction shown in FIG. 18 at the bent portion N5, and the transverse wall 131B is provided at a position where the individual passage R is bent in a just upward direction as shown in FIG. 18.

With the provision of the transverse walls 131A, 131B, the following advantageous effects can be acquired.

As shown in FIG. 14, when solution droplets V which move along the ceiling surface of the individual passage R (a lower surface of the lid body 110 of the upper lid 100) reach the transverse wall 131A, 131B, the solution droplets V form a mass, and the solution droplets V in the mass form move downward along the transverse wall 131A, 131B. Accordingly, the solution droplets V fall and are liable to drop on a floor surface of the individual passage R (the upper surface wall 65A of the middle lid 60) and hence, the solution droplets V minimally reach the common passage U, the collective exhaust portion Q and the exhaust duct 200 whereby the solution droplets V minimally leak to the outside. Then, the solution droplets V fallen on the floor surface of the individual passage R return to the cell chamber 25 through the return flow hole 82. Accordingly, the reduction of an electrolyte solution W in each cell chamber 25 can be suppressed.

When a vibration test where vibrations are continuously applied to the lead-acid battery 10 for a predetermined time was performed under the following conditions and the following result was obtained.
(1) The transverse wall 131 provided to the same individual passage R is set to the transverse wall at one place, that is, the transverse wall 131A shown in FIG. 9, and the evaluation is performed by changing a projecting height L of the transverse wall 131.
(2) Frequency of vibrations is set to 7 Hz, acceleration is set to 19.6 m/s$^2$ in a vertical direction, and a test time (a time during which vibrations are applied to the lead-acid battery 10) is set to 15 minutes.
(3) The number of evaluation levels is set to 10 (N=10).
(4) When the test is finished, the exhaust duct 200 is checked with naked eyes. "OK" is given to the case where solution droplets V have not reached the exhaust duct 200, and "NG" is given to the case where solution droplets V have reached the exhaust duct 200.

Figure 15:
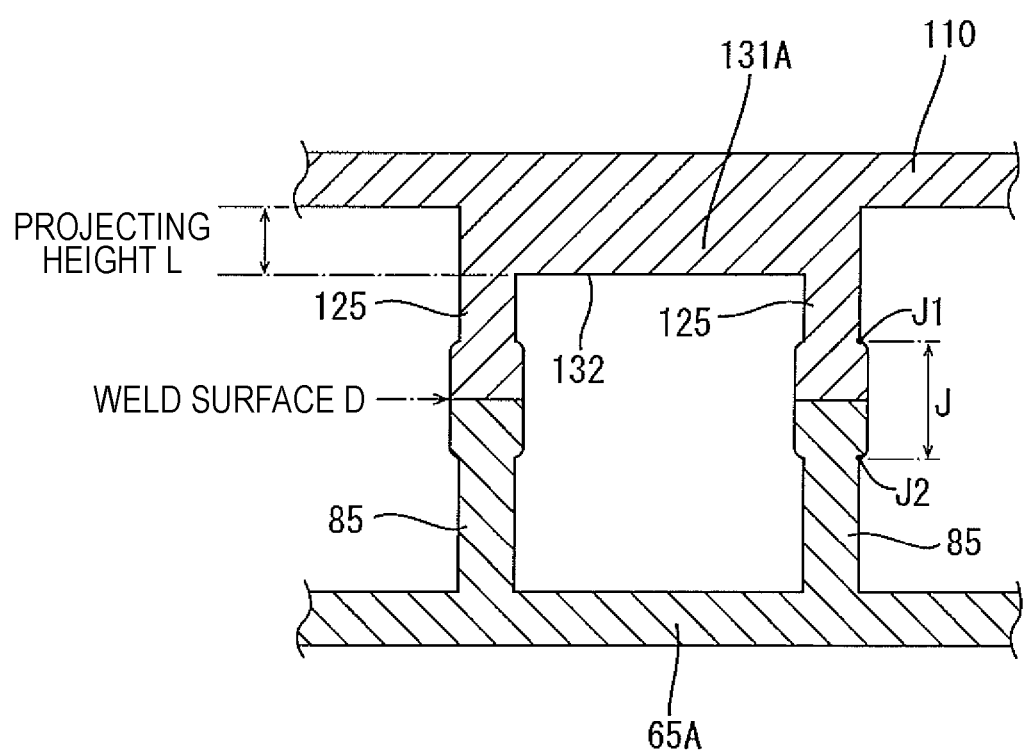
FIG. 15 is a cross-sectional view (a cross-sectional view taken along a line C-C in FIG. 9) showing the relationship between the transverse wall and a welded portion.

The projecting height L of the transverse wall 131 means a length in the vertical direction with reference to the ceiling surface of the individual passage R (that is, the lower surface of the lid body 110 of the upper lid 100) (see FIG. 14, FIG. 15).

As shown in FIG. 16, when the test was performed 10 times in total under the condition where the projecting height L of the transverse wall 131 is set to "0 (no wall)", the evaluation "NG" was given all 10 times. When the test was performed 10 times in total under the condition where the projecting height L of the transverse wall 131 is set to "0.2 mm", the evaluation "NG" was given 8 times and the evaluation "OK" was given 2 times. When the test was performed 10 times in total under the condition where the projecting height L of the transverse wall 131 is set to "0.5 mm", the evaluation "NG" was given 7 times and the evaluation "OK" was given 3 times.

On the other hand, when the test was performed 10 times in total under the condition where the projecting height L of the transverse wall 131 is set to "1.0 mm", the evaluation "NG" was given once and the evaluation "OK" was given 9 times. When the test was performed 10 times in total under the condition where the projecting height L of the transverse wall 131 is set larger than "1 mm", the evaluation "OK" was given all 10 times and there were no products which received the evaluation "NG".

From the above-mentioned vibration test, it is confirmed that when the projecting height L of the transverse wall 131 is set to "0.2 mm" or more, an effect of suppressing a leakage of solution droplets V to the outside along the ceiling portion of the individual passage R can be acquired. Further, it is also confirmed that when the projecting height L of the transverse wall 131 is set to "1.0 mm" or more, a leakage of solution droplets V to the outside along the ceiling portion of the individual passage R can be remarkably suppressed.

When the vibration test is performed by changing the conditions (1), (3) as described below, a result shown in FIG. 17 was obtained.
(1) The evaluation is performed by changing a position where the transverse wall 131 is provided with respect to the same individual passage R.
(2) Frequency of vibrations is set to 7 Hz, acceleration is set to 19.6 m/s$^2$ in a vertical direction, and a test time (a time during which vibrations are applied to the lead-acid battery 10) is set to 15 minutes.
(3) The projecting height L of the transverse wall 131 is set to "1.0 mm", and the number of evaluation levels is set to 10 (N=10).
(4) When the test is finished, the exhaust duct 200 is checked with naked eyes. The evaluation "OK" is given to the case where solution droplets V have not reached the exhaust duct 200, and "NG" is given to the case where solution droplets V have reached the exhaust duct 200.

As a test result, as shown in FIG. 17, when the test was performed 10 times in total under the condition where the position where the transverse wall 131 is provided is arranged on the straight line of the common passage U, the evaluation "NG" was given 5 times and the evaluation "OK" was given 5 times. When the test was performed 10 times in total under the condition where only the transverse wall 131A in FIG. 9 is provided as the transverse wall 131, the evaluation "NG" was given once and the evaluation "OK" was given 9 times. Further, also when the test was performed 10 times in total under the condition where only the transverse wall 131B in FIG. 9 is provided as the transverse wall 131, the evaluation "NG" was given once and the evaluation "OK" was given 9 times.

The inventor of the present invention has considered as follows. Assuming that solution droplets reach the common passage U, a large amount of solution droplets collected from six individual passages R move along the ceiling surface of the common passage U and hence, an amount of solution droplets which moves along the ceiling surface of each individual passage R is smaller than an amount of solution droplets which moves along the ceiling surface of the common passage U. Accordingly, in case of the ceiling surface of individual passage R, solution droplets V can be effectively dammed by the low transverse wall. From the above-mentioned vibration tests, it was confirmed that an effect of suppressing a leakage of solution droplets V to the outside becomes higher by providing the transverse walls 131A, 131B to the individual passage R rather than the common passage U.

Further, in each individual passage R, a moving speed of solution droplets V which move along the ceiling surface at the bent portion N is slow compared to a moving speed of solution droplets V which move along the ceiling surface at a straight portion (for example, a straight line zone between bent points N2 to N3 and the common passage U). Accordingly, by providing the transverse wall 131 corresponding to the bent portion N where the moving speed of solution droplets V is slow, an effect of suppressing a leakage of solution droplets V to the outside along the ceiling portion of the individual passage R can be further enhanced.

Further, as shown in FIG. 15, the transverse walls 131A, 131B have a shorter projecting height L from the lid body 110 of the upper lid 100 than the upper-side passage wall 125, and lower end portions 132 of the transverse walls 131A, 131B are positioned above upper ends J1 of welded portions J of the upper-side passage wall 125 and the lower-side passage wall 85 and above a lower end portion of the porous filter 205. With such a configuration, in manufacturing a battery, at the time of thermally welding the upper-side passage wall 125 of the upper lid 100 and the lower-side passage wall 85 of the middle lid 60 to each other, the transverse wall 131 is not brought into contact with the heating plates HP (see FIG. 21) and hence, it is possible to suppress a phenomenon that a lower portion of the wall is melted so that the shape of the wall is deformed.

A "welded portion J" is a portion where the upper-side passage wall 125 and the lower-side passage wall 85 are thermally welded to each other. To be more specific, as shown in FIG. 15, the welded portion J includes a weld surface D formed between the upper-side passage wall 125 and the lower-side passage wall 85, and covers a range (J1 to J2) where a thickness of the passage wall is increased by thermal welding.

To establish the relationship where the lower end portion 132 of the transverse wall 131A, 131B is positioned above the upper end J1 of the welded portion J, the projecting height of the upper-side passage wall 125 and the projecting height L of the transverse wall 131A, 131B may be decided by taking into account a melting margin of the upper-side passage wall 125 by the heating plate HP. That is, when a melting margin (a length of a portion melted by the heating plate) of a distal end portion of the upper-side passage wall 125 is "Cmm", for example, it is sufficient to set the projecting height L of the transverse wall 131A, 131B shorter than a projecting height of the upper-side passage wall 125 by "Cmm" or more.

3. Method of Manufacturing Lead-Acid Battery

Figure 19:
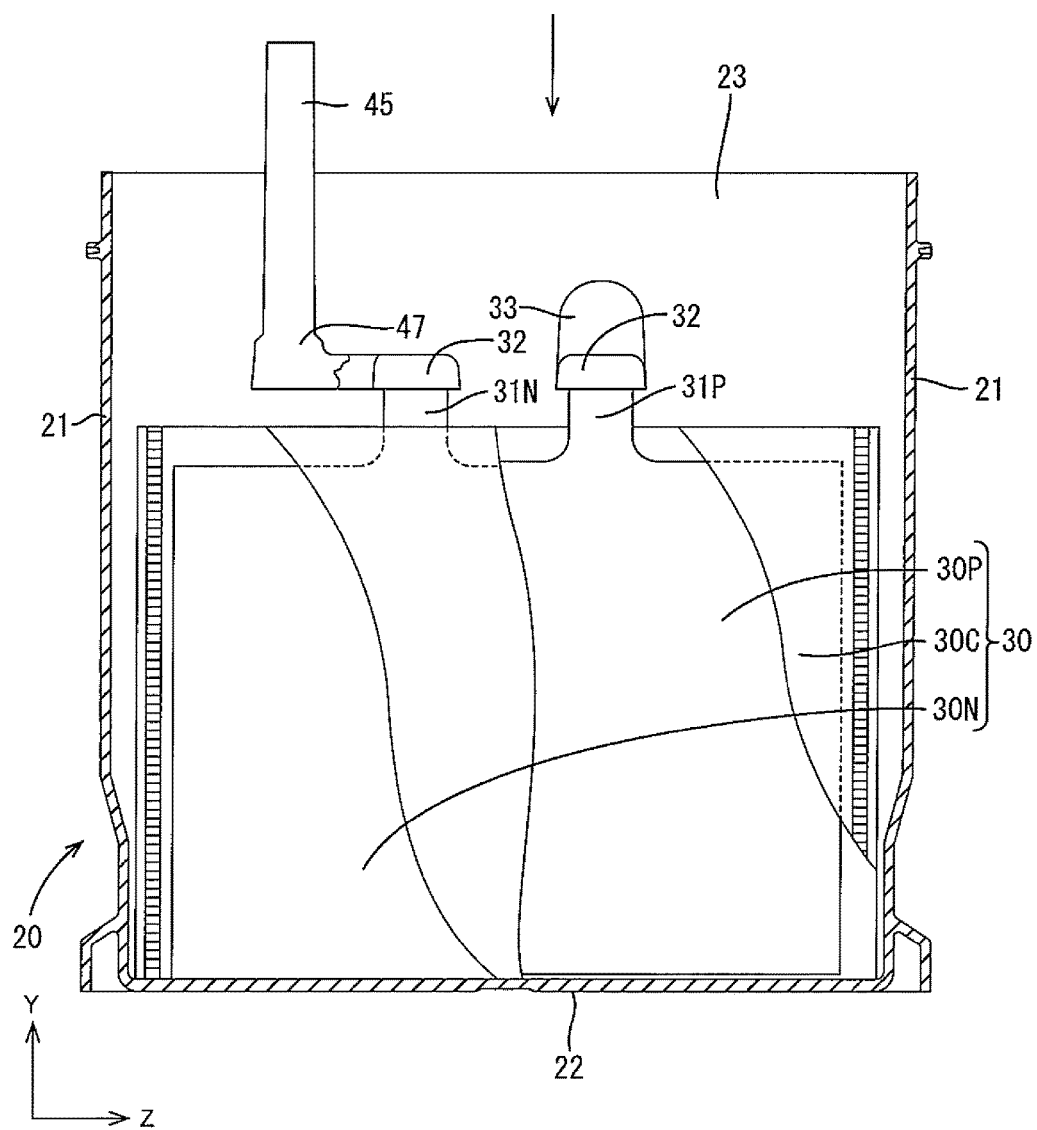
FIG. 19 is a view showing a manufacturing step of a lead-acid battery (showing a state where an element is loaded in a container).

The lead-acid battery 10 according to the present invention is manufactured in accordance with the following steps (A) to (E).
(A) Step of inserting element and connecting connection body
(B) Step of welding middle lid
(C) Step of filling electrolyte solution
(D) Step of welding upper lid
(E) Step of welding element To be more specific, in manufacturing the lead-acid battery 10, firstly, the element inserting step is performed where the element 30 is inserted into the respective cell chambers 25 of the container 20 (see FIG. 19). Thereafter, the connecting portion connecting step is performed where the connecting portions 33 disposed on the straps 32 are connected between the respective cell chambers 25. With such steps, the elements 30 disposed in the respective cell chambers 25 are brought into a state where the elements 30 are connected in series.

Next, the middle lid welding step is performed where the middle lid 60 is welded to the container 20. In this step, firstly, a heated plate is arranged between the container 20 and the middle lid 60, the outer wall 21 of the container 20 and the upper end surface of the partition 23 are brought into contact with the lower surface of the heating plate, and the rib 91 of the middle lid 60 and the lower end surface of the lid partition 93 are brought into contact with the upper surface side of the heating plate. Then, such a contact state is held for a fixed time. With such a step, the outer wall 21 on the container 20 and the upper end portion of the partition 23 are melted, and the rib 91 on the middle lid 60 and a lower end portion of the lid partition 93 are melted.

Figure 20:
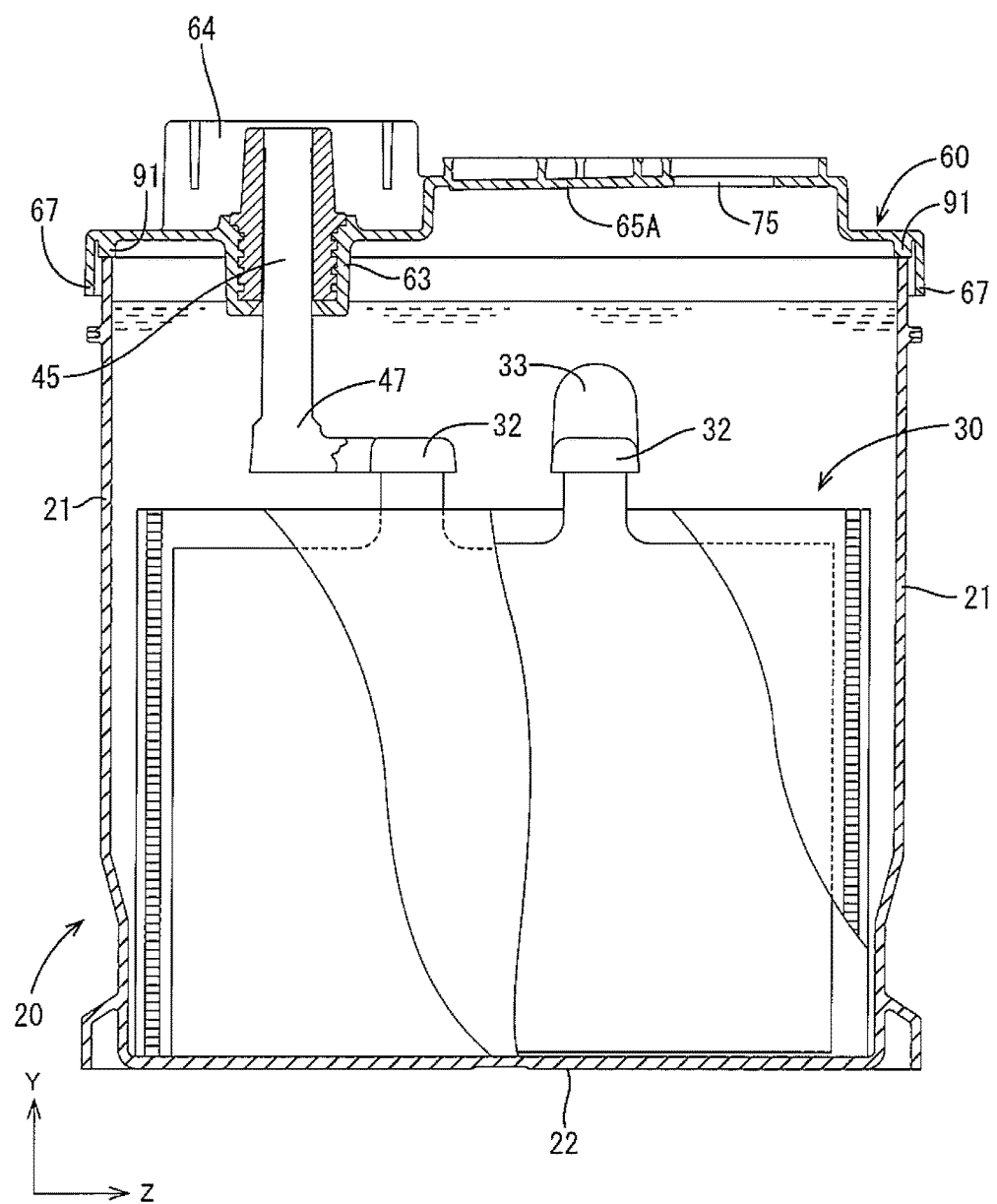
FIG. 20 is a view showing a manufacturing step of the lead-acid battery (showing a state where the middle lid is welded to the container).

Thereafter, the heating plate is removed, and the position of the middle lid 60 and the position of the container 20 are aligned with each other such that a distal end of the melted outer wall 21 and a distal end of the melted rib 91 are aligned with each other and a distal end of the melted partition 23 and a distal end of the lid partition 93 are aligned with each other. Then, the middle lid 60 is assembled to the container 20. Due to such a step, the rib 91 on the middle lid 60 is brought into contact with the upper end surface of the outer wall 21 of the container 20 in an overlapping manner, and the lid partition 93 on the middle lid 60 is brought into contact with the upper end surface of the partition 23 of the container 20 in an overlapping manner. Next, using a press plate not shown in the drawing, the middle lid 60 and the container 20 are pressed from above and below in the vertical direction. Accordingly, the distal end of the melted outer wall 21 and the distal end of the melted rib 91 are welded to each other, and the distal end of the melted partition 23 and the distal end of the lid partition 93 are welded to each other. Due to such steps, the container 20 and the middle lid 60 are welded to each other (see FIG. 20). With respect to a point that two resin members are welded to each other by making use of a heating plate, the welding method described above is equal to the welding method shown in FIG. 21. Thereafter, an electrolyte solution filling step is performed where an electrolyte solution W is filled into the inside of the container 20 through the solution filling holes 75 formed in the middle lid 60.

Figure 21:
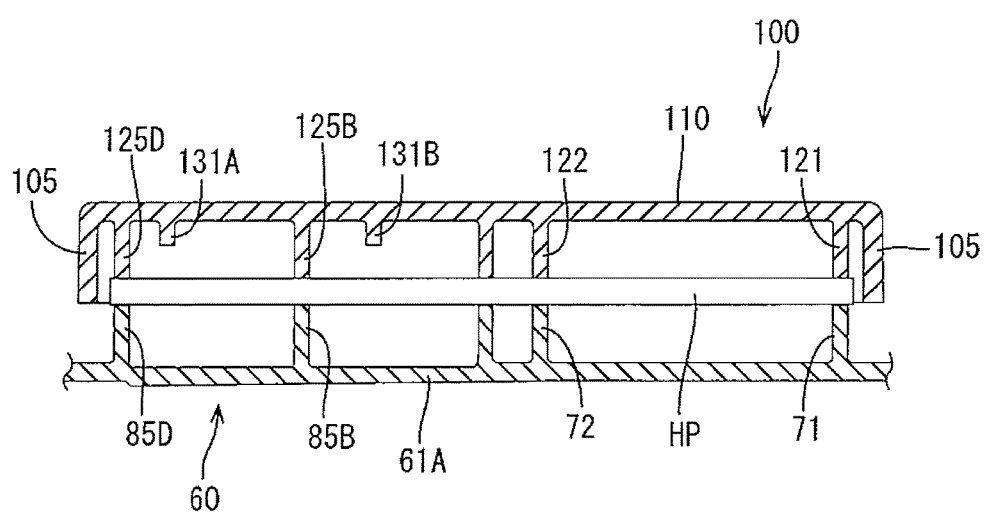
FIG. 21 is a view showing a manufacturing step of the lead-acid battery (showing a melting step using a heating plate).

Next, an upper lid welding step is performed where the upper lid 100 is welded to the middle lid 60 which is welded to the container 20. In this step, firstly, as shown in FIG. 21, a heated heating plate (corresponding to "heating member" of the present invention) HP is arranged between the middle lid 60 and the upper lid 100, and upper end surfaces of the respective lower-side peripheral walls 83, the respective lower-side passage walls 85, the respective lower-side sleeve portions Q1 and the respective lower-side partitions 71 to 73 which are provided on an upper surface side of the middle lid 60 are brought into contact with a lower surface of the heating plate HP. Further, lower end surfaces of the respective upper-side peripheral walls 123, the respective upper-side passage walls 125, the respective upper-side sleeve portions Q2 and the respective upper-side partitions 121 to 123 which are provided to a lower surface of the upper lid 100 are brought into contact with an upper surface side of the heating plate HP. Then, such a contact state is held for a fixed time. Due to such a step, the upper end portions of the respective lower-side peripheral walls 83, the respective lower-side passage walls 85, the respective lower-side sleeve portions Q1 and the respective lower-side partitions 71 to 73 which are provided on the upper surface of the middle lid 60 are melted. On the other hand, the lower end portions of the respective upper-side peripheral walls 123, the respective upper-side passage walls 125, the respective upper-side cylindrical portions Q2 and the respective upper-side partitions 121 to 123 which are provided on the lower surface of the upper lid 100 are melted.

Here, a wall height of the transverse wall 131 formed on the lower surface of the upper lid 100 is lower than a wall height of the upper-side passage wall 125. Accordingly, as shown in FIG. 21, the transverse wall 131 is not brought into contact with the heating plate HP. That is, the transverse wall 131 is spaced apart from the heating plate HP. Accordingly, during heating performed by the heating plate HP, the transverse wall 131 is not melted so that the transverse wall 131 can maintain the shape thereof.

Thereafter, the heating plate HP is removed, and the upper lid 100 is assembled to the middle lid 60 from above while aligning the position of the middle lid 60 and the position of the upper-lid 100 with each other. In such positional alignment, a distal end of each melted lower-side peripheral wall 83 and a distal end of each melted upper-side peripheral wall 123 are aligned with each other, a distal end of each melted lower-side passage wall 85 and a distal end of each melted upper-side passage wall 125 are aligned with each other, a distal end of each melted lower-side sleeve portion Q1 and a distal end of each melted upper-side sleeve portion Q2 are aligned with each other, and distal ends of the respective melted lower-side partitions 71 to 73 and distal ends of the respective melted upper-side partitions 121 to 123 are aligned with each other. Accordingly, the upper-side peripheral wall 123 of the upper lid 100 is brought into contact with the upper end surface of the lower-side peripheral wall 83 of the middle lid 60 in an overlapping manner. The upper-side passage wall 125 of the upper lid 100 is brought into contact with the upper end surface of the lower-side passage wall 85 of the middle lid 60 in an overlapping manner. The upper-side sleeve portion 82 of the upper lid 100 is brought into contact with the upper end surface of the lower-side sleeve portion Q1 in an overlapping manner. The upper-side partitions 121 to 123 of the upper lid 100 are brought into contact with the upper end surfaces of the lower-side partitions 71 to 73 of the middle lid 60 in an overlapping manner.

Next, using a press plate not shown in the drawing, the lead-acid battery 10 to which the upper lid 100 is assembled is pressed from above and below in the vertical direction. Accordingly, the distal ends of the respective melted lower-side peripheral walls 83 and the distal ends of the respective melted upper-side peripheral walls 123 are welded to each other, and the distal end of the respective melted lower-side passage walls 85 and the distal ends of the respective melted upper-side passage walls 125 are welded to each other. Further, the distal ends of the respective melted lower-side partitions 71 to 73 and the distal ends of the respective melted upper-side partitions 121 to 123 are welded to each other. Due to such welding, the upper lid 100 and the middle lid 60 are welded to each other (see FIG. 3). Due to such steps, the middle lid 60 and the upper lid 100 are assembled to each other as the lid member 50, and between both lids 60, 100, the exhaust sleeve portion T and the individual passage R are formed for each one of the cell chambers 25, and the common passage U and the collective exhaust portion Q are formed (manufacture of the lid member 50). Thereafter, a step of welding the bushing 41 and the pole 45 and the like are performed. With such steps, manufacturing of the lead-acid battery 10 is completed.

4. Description of Advantageous Effects

In the lead-acid battery 10 of this embodiment, by providing the transverse wall 131A, 131B to each individual passage R, and by positioning the lower end portion 132 of the transverse wall 131A, 131B above the upper end J1 of the welded portion J, a leakage of solution droplets V caused by vibrations can be suppressed.

A projecting height of the transverse wall 131A, 131B from the ceiling surface is set to 1.0 mm or more. With such a configuration, it becomes remarkably difficult for solution droplets V which move along the ceiling surface to get over the transverse wall 131A, 131B and hence, an effect of suppressing a leakage of solution droplets V can be remarkably enhanced.

The transverse wall 131A, 131B is formed in each individual passage R. The common passage U is formed of a monotonous passage having a narrow width and hence, the direction that a solution can move in the passage is restricted. Accordingly, when the transverse wall is formed in the common passage U, a solution easily gets over the transverse wall and hence, an effect of suppressing a leakage of solution droplets is small regardless of the presence or non-presence of melting of the transverse wall. On the other hand, the individual passage R is a labyrinth like passage using a wide space and hence, a solution minimally gets over the transverse wall. Accordingly, by forming the transverse wall on the individual passage R and by not melting the transverse wall, the effect of suppressing a leakage of solution droplets can be remarkably enhanced compared to the case where the transverse wall is melted.

The transverse wall 131A, 131B is arranged away from the notched portion 124 formed in the exhaust sleeve portion T. To be more specific, in the individual passage R, the transverse wall 131A, 131B is arranged at a position closer to the common passage U (the position behind the common passage U) than the notched portion 124 in an exhaust direction. By adopting such arrangement, an electrolyte solution W which is splashed from the cell chamber 25 of the container 20 and enters the inside of the individual passage R through the notched portion 124 can be dammed by the transverse wall 131A, 131B. Accordingly, it is possible to prevent the occurrence of a phenomenon that an electrolyte solution W splashed from the cell chamber 25 of the container 20 through the notched portion 124 is not interrupted by the transverse wall 131A, 131B, and directly adheres to the individual passage R at the position closer to the common passage U than the transverse wall 131A, 131B of the individual passage R, that is, at the position close to an outlet to the outside. Accordingly, an amount of solution droplets V which are splashed from the cell chamber 25 of the container 20, enters the individual passage R and moves along the ceiling surface of the individual passage R can be reduced thus further suppressing a leakage of solution droplets V caused by vibrations.

In the individual passage R, a moving speed of solution droplets V which moves along the ceiling surface is slow in the bent portion N compared to the straight-line portion. In the configuration of this embodiment, the transverse wall 131A, 131B is provided corresponding to the bent portion N where a moving speed of the solution droplets V is slow and hence, it is possible to effectively suppressing solution droplets V from getting over the transverse wall 131A, 131B.

The middle lid 60 has the transverse wall 131A, 131B at a plurality of places on the individual passage R. Accordingly, even when solution droplets V get over the transverse wall 131A at a first stage, solution droplets V which get over the transverse wall 131A can be dammed by the transverse wall 131B at a subsequent stage. Accordingly, the solution droplets V further minimally leak to the outside.

The individual passage R is a non-straight-line labyrinth like passage and hence, water vapor contained in a gas which passes through the individual passage R is likely to condense. Accordingly, an amount of electrolyte solution is minimally decreased.

The transverse wall 131A is positioned on an extension of the passage wall 125A, and the transverse wall 131B is positioned on an extension of the passage wall 125G. With such a configuration, the transverse walls 131A, 131B can be formed by molding by extending forming grooves for forming passage walls which are formed on a die while changing depths of the grooves.

Both end portions of the transverse walls 131A are connected to wall surfaces of the passage walls 125A, 125C. With such a configuration, the rigidities of the passage walls 125A, 125C can be increased. Further, both end portions of the transverse walls 131B are connected to wall surfaces of the passage walls 125G, 125E. With such a configuration, the rigidities of the passage walls 125G, 125E can be increased.

In the above-mentioned configuration of this embodiment, the individual passage R is provided for each one of the cell chambers 25 of the container 20. With such a configuration, a gas generated from each cell chamber 25 can be discharged to the outside through each individual passage R. Further, solution droplets V in the individual passage R can be made to return to each cell chamber 25 through the return flow hole 82. That is, solution droplets V such as water droplets formed when water vapor contained in a gas condenses in the individual passage R all return to the original cell chamber 25 and hence, it is possible to suppress a solution amount of electrolyte solution W from becoming non uniform between the respective cell chambers 25.

<Other Embodiments>

The present invention is not limited to the embodiments described above in conjunction with the above-mentioned description and drawings and, for example, the following embodiments also fall within the technical scope of the present invention.

Figure 22:
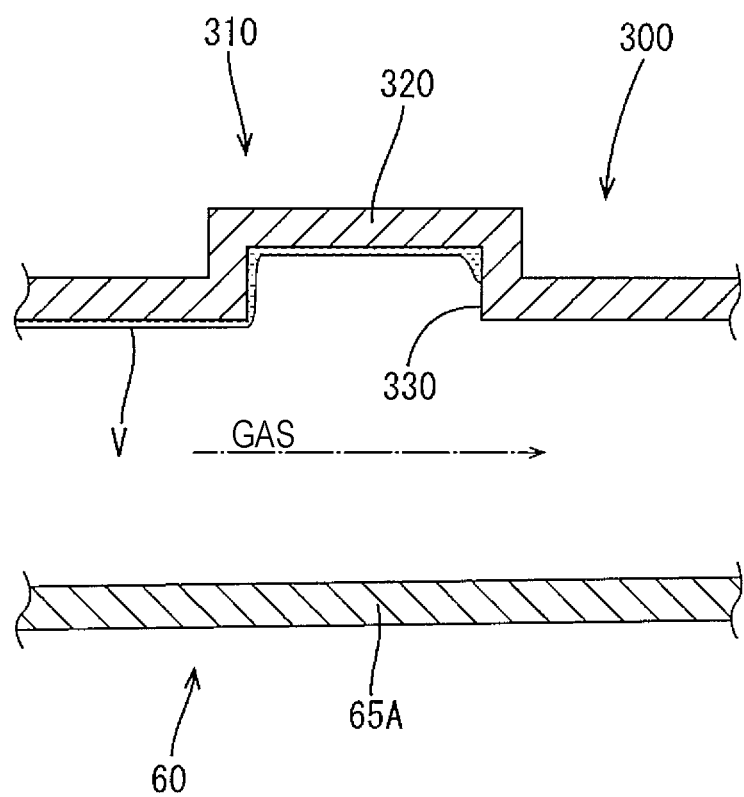
FIG. 22 is a view showing a modification of the transverse wall.

In the above-mentioned embodiment, the lid body 110 of the middle lid 60 is formed into a flat shape, and the transverse walls 131A, 131B are formed into a shape where the transverse walls 131A, 131B project downward from the lower surface of the lid body 110. It is sufficient that the transverse wall 131 is formed into a shape where the transverse wall 131 projects from the ceiling surface of the individual passage R. For example, as shown in FIG. 22, a recessed portion 310 which is indented upward with respect to a lid body 300 may be formed, and inner side surfaces 330 of the recessed portion 310 may be used as transverse walls. That is, the above-mentioned case adopts the configuration where an upper surface wall 320 of the recessed portion 310 forms a ceiling surface of an individual passage R, and the inner side surfaces 330 project downward from the upper surface wall 320 and hence, the inner side surfaces 330 function as the transverse walls whereby this embodiment can acquire the substantially same advantageous effects as the above-mentioned embodiment.

In the above-mentioned embodiment, the case is exemplified where the passage wall RW which forms the side wall of the individual passage R has the split structure formed of the lower-side passage wall 85 on the middle lid 60 and the upper-side passage wall 125 on the upper lid 100. However, besides the vertically split structure, the passage wall RW may adopt the single wall structure. That is, the passage wall RW may be formed of only the upper-side passage wall 125 on the upper lid 100 by forming the upper-side passage wall 125 using a wall whose length is extended by a length of the lower-side passage wall 85. When the passage wall RW is formed of only the upper-side passage wall 125, airtightness may be kept by welding a lower end portion of the upper-side passage wall 125 to the upper surface wall 65A of the plateau portion 65 of the middle lid 60. In the same manner, the exhaust sleeve portion T may also adopt the single wall structure formed of an exhaust sleeve portion on the upper lid 100 in place of the vertically split structure. That is, a peripheral wall of the exhaust sleeve portion T may be formed of only the upper-side peripheral walls 123A to 123D on the upper lid 100 by extending a length of four upper-side peripheral walls 123A to 123D on the upper lid 100 by a length of the lower-side peripheral walls 83A to 83D. In the same manner, the side wall of the common passage U and the collective exhaust portion Q also may adopt the single wall structure formed of the wall on the upper lid 100 in place of the vertically split structure.

In the above-mentioned embodiment, the case is exemplified where the transverse wall 131A, 131B is formed at two places on the individual passage R. However, the transverse wall 131A, 131B may be formed at least one place or more on the individual passage R, and the transverse wall 131A, 131B may be formed at one place or three or more places on the individual passage R.

In the above-mentioned embodiment, the case is exemplified where the transverse wall 131A and the transverse wall 131B are provided on the extension of the passage wall 125A or the passage wall 125G. However, it is sufficient that the transverse wall 131A, 131B traverses the individual passage R, and the transverse wall 131A, 131B may be provided to places other than the extension of the passage wall 125A or the passage wall 125G.

In the above-mentioned embodiment, the configuration is exemplified where a gas generated in each cell chamber 25 is transferred to the common passage U through each individual passage R, and the gases are collectively discharged from the exhaust duct 200 of the collective exhaust portion Q. The method of discharging a gas may be an individual discharging method besides the collective discharging method using the collective exhaust portion Q. That is, a gas generated in each cell chamber 25 may be individually discharged from the discharge port provided to each individual passage R.

In the above-embodiment, although the configuration is exemplified where the plurality of cell chambers 25 are disposed in the container 20, the container 20 may be configured not to include the cell chamber 25.

What is claimed is:

1. A lead-acid battery comprising:
   an element;
   an electrolyte solution;
   a container housing the element and the electrolyte solution; and
   a lid member sealing the container,
   wherein the lid member includes:
      a middle lid covering the container;
      an upper lid welded to an upper portion of the middle lid in an overlapping manner; and
      an exhaust passage arranged between the middle lid and the upper lid, through which an inside of the container is communicated with an outside,
   wherein a bottom surface of the exhaust passage is inclined such that the solution in the passage returns into the container,
   wherein the container, the middle lid and the upper lid are disposed in this order in a first direction from a bottom to a top of the lead-acid battery, and
   wherein the upper lid includes:
      a passage wall welded to the middle lid, projecting downward from a lower surface of the upper lid and forming a side wall of the exhaust passage; and
      a transverse wall projecting downward from a ceiling surface of the exhaust passage and traversing the exhaust passage,
      a lower end portion of the transverse wall is positioned above in the first direction a welded portion between the passage wall and the middle lid, and
   wherein a first length in the first direction from the lower end portion of the transverse wall to the ceiling surface of the exhaust passage is shorter than a second length in the first direction from a weld surface, at which the passage wall is welded to the middle lid, to the lower surface of the upper lid.

2. The lead-acid battery according to claim 1, wherein a projecting height of the transverse wall from the ceiling surface is 1.0 mm or more.

3. The lead-acid battery according to claim 1, wherein the container is partitioned into a plurality of cell chambers, wherein the exhaust passage includes a plurality of individual passages which communicate with the plurality of cell chambers, respectively, and a common passage which is communicated with the individual passages and collectively discharges a gas from the individual passages to the outside, and wherein at least one transverse wall is formed on each of ceiling surfaces of the individual passages.

4. The lead-acid battery according to claim 3, wherein at least the upper lid is melted so as to weld the middle lid and the upper lid to each other.

5. The lead-acid battery according to claim 3, wherein the transverse wall is provided on an extension of the passage wall.

6. The lead-acid battery according to claim 3, wherein the individual passage includes a bent portion at which the individual passage is bent, and the transverse wall is arranged corresponding to the bent portion.

7. The lead-acid battery according to claim 3, wherein the middle lid includes a lower-side passage wall which projects upward toward an upper lid side, wherein the upper lid includes an upper-side passage wall which projects downward toward a middle lid side, and is welded to the lower-side passage wall, and wherein the transverse wall is positioned above a welded portion between the upper-side passage wall and the lower-side passage wall.

8. The lead-acid battery according to claim 3, wherein the transverse wall is provided at a portion of the individual passage where a passage width changes from a wide state to a narrow state in a direction toward an exhaust outlet direction.

9. The lead-acid battery according to claim 3, wherein the middle lid includes a communication hole through which the inside of the container and the individual passage are communicated with each other, wherein the upper lid includes an exhaust sleeve portion which surrounds a periphery of the communication hole formed in the middle lid and in which an opening portion which is made to communicate with the individual passage is formed, and wherein the transverse wall is arranged away from the opening portion of the exhaust sleeve portion.

* * * * *